(12) United States Patent
Rodriguez et al.

(10) Patent No.: US 7,954,579 B2
(45) Date of Patent: Jun. 7, 2011

(54) ADAPTIVE CONTROL STRATEGY AND METHOD FOR OPTIMIZING HYBRID ELECTRIC VEHICLES

(75) Inventors: Fernando Rodriguez, Hammond, IN (US); Srdjan M. Lukic, Chicago, IL (US); Ali Emadi, Chicago, IL (US)

(73) Assignee: Illinois Institute of Technology, Chicago, IL (US)

( * ) Notice: Subject to any disclaimer, the term of this patent is extended or adjusted under 35 U.S.C. 154(b) by 437 days.

(21) Appl. No.: 12/025,376

(22) Filed: Feb. 4, 2008

(65) Prior Publication Data

US 2009/0198396 A1    Aug. 6, 2009

(51) Int. Cl.
*B60W 10/06* (2006.01)
*B60W 10/08* (2006.01)

(52) U.S. Cl. ............... 180/65.265; 180/65.275; 903/930; 701/22

(58) Field of Classification Search ............. 180/65.265, 180/65.275, 65.28, 65.285; 903/930; 701/22
See application file for complete search history.

(56) References Cited

U.S. PATENT DOCUMENTS

| | | | | |
|---|---|---|---|---|
| 6,054,710 | A * | 4/2000 | Bruggeman | 250/307 |
| 6,424,961 | B1 * | 7/2002 | Ayala | 706/25 |
| 6,442,535 | B1 * | 8/2002 | Yifan | 706/4 |
| 6,534,954 | B1 * | 3/2003 | Plett | 320/132 |
| 7,069,256 | B1 * | 6/2006 | Campos | 706/16 |
| 7,193,385 | B2 | 3/2007 | Emadi et al. | |
| 7,467,117 | B2 * | 12/2008 | Kermani | 706/20 |
| 2004/0034460 | A1 * | 2/2004 | Folkerts et al. | 701/54 |
| 2005/0052080 | A1 * | 3/2005 | Maslov et al. | 307/10.1 |
| 2008/0319933 | A1 * | 12/2008 | Moussa et al. | 706/31 |

OTHER PUBLICATIONS

A. Rajagopalan et al., Development of Fuzzy Logic and Neural Network Control and Advanced Emissions modeling for parallel Hybrid Vehicles, NREL Subcontractor Report, NREL/SR-540-32919, Dec. 2003.
S. Lukic et al., Optimization of the Control Strategy of a Parallel Hybrid Electric Vehicle using Neural Networks, IIT course ECE 764-501: Vehicular Power Systems, Feb. 2007 (29 pages).
B. Baumann et al., Intelligent Control of Hybrid Vehicles Using Neural Networks and Fuzzy Logic, SAE Technical Document 981061 (Abstract).

(Continued)

*Primary Examiner* — J. Allen Shriver, II
*Assistant Examiner* — John D Walters
(74) *Attorney, Agent, or Firm* — Pauley Petersen & Erickson

(57) ABSTRACT

This invention relates a control strategy for a hybrid electric vehicle having an electric motor, a battery and an internal combustion engine. The control strategy improves fuel economy and reduces emissions while providing sufficient acceleration over a varying set of driving conditions through an adaptive control unit with an artificial neural network. The artificial neural network is trained on a pre-processed training set based on the highest fuel economies of multiple control strategies and multiple driving profiles. Training the artificial neural network includes a training algorithm and a learning algorithm. The invention also includes a method of operating a hybrid electric vehicle with an adaptive control strategy using an artificial neural network.

20 Claims, 22 Drawing Sheets

OTHER PUBLICATIONS

F. Harmon et al., The control of a parallel hybrid-electric propulsion system for a small unmanned aerial vehicle using a CMAC neural network, Neural Networks, 2005, vol. 18, Issue 5-6, pp. 772-780 (Abstract).

www.greencarcongress.com, Neural-Network Engine Controller for Higher Efficiency and Lower Emissions, Emissions, Engines, Fuel Efficiency, Vehicle Systems, Jan. 2006 pp. 1-2.

Neural Networks, Matlab neural network toolbox from software help file, pp. 23-24.

Neuron Model and Network Architectures, Matlab neural network toolbox from software help file, pp. 39-62.

Co-Pending U.S. Appl. No. 11/977,118, filed Oct. 23, 2007.

V.H. Johnson et al., HEV Control Strategy for Real-Time Optimization of Fuel Economy and Emissions, Society of Automotive Engineers, 2000, vol. 1, 15 pages.

F.G. Harmon et al., Application of CMAC Neural Network to the Control of a Parallel Hybrid-Electric Propulsion System for a Small Unmanned Aerial Vehicle, IEEE Conference Jul. 2005, pp. 355-360.

B. Baumann et al., Intelligent Control of Hybrid Vehicles Using Neural Networks and Fuzzy Logic, SAE Technical Paper 981061, 1998, Feb. 23-26, 9 pages.

Co-pending U.S. Appl. No. 12/214,032, filed Jun. 16, 2008, Digital Control of Motor Drives.

* cited by examiner

TABLE I
HEV CHASSIS PARAMETERS

| Parameter | Value |
|---|---|
| Coefficient of drag | 0.335 |
| Frontal Area | 2 m |
| Wheelbase | 2.6m |
| Curb Weight | 1400 kg |

FIG. 16

TABLE II
HEV SUBCOMPONENT PARAMETERS

| Parameter | | Value |
|---|---|---|
| ICE | Manufacturer | Toyota |
| | Type | SI Engine |
| | Max. Power | 43 kW |
| | Mass | 137 kg |
| | Peak Efficiency | 35% |
| Motor Generator | Manufacturer | Toyota |
| | Type | PM |
| | Max. Power | 30 kW cont. |
| | Mass | 57 kg. |
| | Peak Efficiency | 95% |
| Battery Pack | Manufacturer | Toyota |
| | Type | NiMH |
| | Capacity | 6.5 Ah |
| | Voltage per Pack | 8V |

FIG. 17

TABLE III
SIMULATED DRIVE PATTERNS AND RESULTING FUEL ECONOMIES

| Drive Cycle | Efficiency Mode | Parallel Assist | Fuel Mode |
|---|---|---|---|
| UDDS | 44.2 | 40.9 | 42.4 |
| HWFET | 52.7 | 54.6 | 53.6 |
| NYCC | 17.1 | 14.1 | 11.8 |
| MANHATTAN | 20.5 | 16.9 | 14.5 |

FIG. 18

TABLE IV
RAW DATA LIST

| | A | B | C | D | E |
|---|---|---|---|---|---|
| 1 | SOC | Torque inp | Speed Input | ICE torque output | Index |
| 4415 | 0.63 | 0.00 | 0.00 | 41.30 | 4414 |
| 4416 | 0.63 | 0.00 | 0.00 | 41.44 | 4415 |
| 4417 | 0.63 | 0.00 | 0.00 | 41.58 | 4416 |
| 4418 | 0.63 | 0.00 | 0.00 | 41.73 | 4417 |
| 4419 | 0.63 | 0.00 | 0.00 | 41.87 | 4418 |
| 4420 | 0.63 | 0.00 | 0.00 | 42.03 | 4419 |
| 4421 | 0.63 | 0.00 | 0.00 | 42.18 | 4420 |
| 4422 | 0.63 | 0.00 | 0.00 | 42.34 | 4421 |
| 4423 | 0.63 | 0.00 | 0.00 | 42.51 | 4422 |
| 4424 | 0.63 | 0.00 | 0.00 | 42.68 | 4423 |
| 4425 | 0.63 | 0.00 | 0.00 | 42.85 | 4424 |
| 4426 | 0.63 | 0.00 | 0.00 | 43.03 | 4425 |
| 4427 | 0.63 | 0.00 | 0.00 | 43.22 | 4426 |

FIG. 19

TABLE V
EXTENDED SIMULATIN RESULTS

| Driving Cycle | Parameter | Fuel Mode | Parallel Assist | NN |
|---|---|---|---|---|
| Combined Drive Cycle | FE | 43.2 | 41.9 | 45.9 |
| | ΔSoC | -0.99% | -1.66% | 2.67% |
| | ΔFE | 0.00% | -3.01% | 6.25% |
| Generic City Drive Cycle | FE | 25.7 | 20.8 | 23.1 |
| | ΔSoC | 0.81% | -2.27% | -4.25% |
| | ΔFE | 0.00% | -19.07% | -10.12% |
| Generic Highway Drive Cycle | FE | 32.8 | 33.60 | 33.00 |
| | ΔSoC | 2.15% | 1.03% | 1.80% |
| | ΔFE | 0.00% | 2.44% | 0.60% |
| Generic Combined Drive Cycle | FE | 30.9 | 29.20 | 30.30 |
| | ΔSoC | 2.14% | 0.86% | 1.03% |
| | ΔFE | 0.00% | -5.50% | -1.94% |

FIG. 20

ADAPTIVE CONTROL STRATEGY AND METHOD FOR OPTIMIZING HYBRID ELECTRIC VEHICLES

BACKGROUND OF THE INVENTION

1. Field of the Invention

The present invention includes an adaptive control strategy for a hybrid electric vehicle.

2. Discussion of the Related Art

There is a general desire to improve performance, increase fuel economy or gas mileage, and/or reduce tailpipe emissions from conventional internal combustion engine vehicles. In response to these desires, hybrid electric vehicles have been developed that incorporate an electric drive system typically in combination with a smaller internal combustion engine and a generator. Known hybrid electric vehicles include a control strategy design for a specific set of driving conditions and do not optimize for varying driving conditions and/or driving styles.

There is a need for a control strategy of a hybrid electric vehicle that results in improved fuel economy and reduced emissions over varying driving conditions.

SUMMARY OF THE INVENTION

A general object of the invention is to provide an adaptive control strategy for a hybrid electric vehicle that uses an artificial neural network to result in improved fuel economy and/or reduced emissions over a variety of driving conditions.

A more specific objective of the invention is to overcome one or more of the problems described above.

The general object of the invention can be attained, at least in part, through a hybrid electric vehicle including an electric motor, a battery and an internal combustion engine. The vehicle also includes a power control module having an adaptive control unit for interfacing with sensors and actuators of the electric motor, the battery and/or the internal combustion engine. The adaptive control unit includes an artificial neural network that is adapted to changing driving conditions, styles and/or patterns.

Hybrid electric vehicles and plug-in hybrid electric vehicles may include control strategies that are tuned to achieve the best fuel economy for specific driving conditions, for example, taxi cabs and buses tuned to yield highest fuel economy during frequent stop and go driving. The adaptive control strategy uses an artificial neural network to develop an optimized control strategy for any type of drive cycle. The adaptive control algorithm can be implemented on any signal processing device, such as, a digital signal processor, a microprocessor a field programmable gate array and the like.

Control strategies take a series of input signals and produce the appropriate output signals. Desirably, the control strategy produces output signals that result in the best fuel economy and reduced emissions. Typical control strategies are fundamentally consistent in the manner that they alter the input signals to produce the output signals, such as, having good reliability, but not adapting to parameter changes in the vehicle's drive train. Parameter changes include wear and/or aging of the drive train sensors and/or actuators. Vehicles are not always utilized in the way that they were designed to be used, such as, driving a city bus on a highway. A consistent control strategy cannot accommodate the change in driving conditions or patterns in order to maintain a optimal high fuel economy, resulting a non-optimized use of power.

The training feature takes input and output signal data collected over time and calculates the vehicle efficiency associated with that data. The training feature then modifies the artificial neural network. Artificial neural network modifications over the life of the vehicle are made to achieve high efficiency operation with higher frequency, for example. The ability to alter the artificial neural network throughout the life of the vehicle allows adjustment and/or tuning as the vehicle ages. Also, the training set can detect driving habits, such as, vehicles used by multiple drivers, and can adjust the artificial neural network accordingly. For example, aggressive driving requires hard acceleration while conservative driving does not. A conventional "constant" control strategy cannot produce optimal power use for different drivers. The data preprocessing subcomponent discriminates between the input/output signals generated from aggressive driving and conservative driving, allowing changes quickly from one driving style to another resulting in optimal fuel economy, for example.

Fuzzy logic relies heavily on human input for the controller to "learn" the methods to control a vehicle. In contrast, the adaptive control strategy uses vehicle data collected over time to achieve optimal vehicle operation with little and/or no human input.

The invention further includes a method of operating a hybrid electric vehicle including the steps of providing a hybrid electric vehicle with an adaptive control unit having an artificial neural network. The method includes the steps of receiving input signals from sensors of the hybrid electric vehicle and calculating output signals in the adaptive control unit based on maximizing fuel economy, minimizing emissions, meeting peak power demands and/or providing acceptable transient response during changing driving conditions. The method includes sending output signals to an internal combustion engine or an electric motor of the hybrid electric vehicle.

According to another embodiment, the invention includes a control scheme for a hybrid electric vehicle with an electric motor and an internal combustion engine. The control scheme includes an adaptive control strategy executing in an artificial neural network to receive input signals, optimize the hybrid electric vehicle and produce output signals to the electric motor and/or the internal combustion engine.

BRIEF DESCRIPTION OF THE DRAWINGS

These and other objects and features of this invention will be better understood from the following detailed description taken in conjunction with the drawings, wherein:

FIG. 16 shows a table of hybrid electric vehicle parameters, according to an embodiment of this invention;

FIG. 17 shows table of hybrid electric vehicle parameters, according to an embodiment of this invention;

FIG. 18 shows a table of simulation results, according to an embodiment of this invention;

FIG. 19 shoes a table of raw data, according to an embodiment of this invention;

FIG. 20 shows a table of simulation results, according to an embodiment of this invention.

DETAILED DESCRIPTION

Figure 1A:
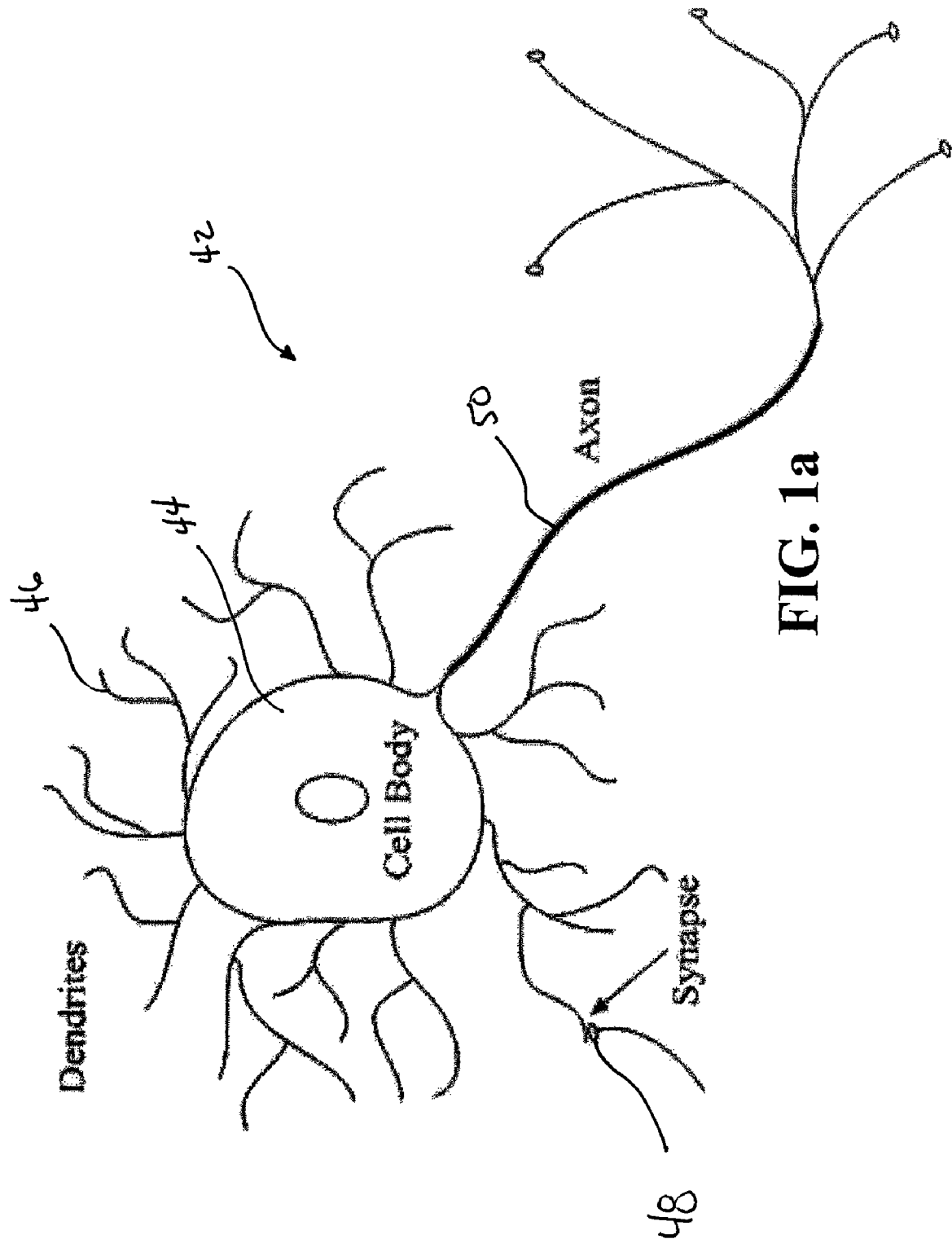
FIG. 1a shows a biological neuron.

In a hybrid electric vehicle 10 ("HEV") the power produced by the internal combustion engine ("ICE") 12 is augmented with power produced by the electric motor ("EM") 14 to maximize the fuel economy of the vehicle 10. A battery 16 provides storage of electrical potential and/or power. The fuel economy improvement is typically achieved by utilizing a smaller internal combustion engine 12, such as, sized for average rather than peak load, operating the engine 12 in its most efficient region, capturing braking energy with the electric motor 14, such as, with regenerative breaking and switching the ICE 12 off when its performance is inefficient while using the EM 14 to propel and/or advance the vehicle 10.

HEV's 10 include broadly any suitable vehicle, such as, passenger cars, trucks, sport utility vehicles, buses, heavy-duty transit buses, semi-trucks, maintenance vehicles, rail engines and/or any other vehicle for transporting persons and/or goods. HEV's 10 can be used in any application, such as, but not limited to, personal, passenger, family, public transportation, mass transit, business, commercial, fleet industrial, agricultural, military, rural, urban, suburban, wilderness, off-road, paved and/or any other suitable location and/or setting.

Any suitable HEV 10 configuration or arrangement is possible, such as, for example, parallel hybrids, series hybrids and/or parallel/series hybrids. HEV's can be used on any surface or medium, such as, on land, on sea, in air, underwater and/or any other suitable usage. According to a preferred embodiment of this invention, the HEV 10 is a land vehicle, such as, a car, a bus, a truck, a sport utility vehicle and/or any other suitable transportation device or mechanism.

Desirably, but not necessarily, HEV's 10 may include a plug 18 and the associated circuitry, such as, to connect to an alternating current ("AC") power source and/or supply for plug-in hybrid ("PHEV") functionality or capability.

Those skilled in the art and guided by the teachings herein appreciate that the adaptive control strategy may be applied to other uses, such as, optimizing between two or more power sources, including electricity generation from wind turbines, solar energy, hydroelectric generators, tidal power generators, gas turbines, coal power plants, nuclear power plants and/or any other suitable supply. The adaptive control strategy can be used to find the most efficient method of sharing the electric loads.

The battery 16 may include any suitable device and/or apparatus for storing, containing, collecting and or distributing electrical power and/or potential, such as, for example, capacitors, ultra-capacitors, lead acid cells, lithium metal ion cells, metal hydride packs and/or any other design buffering and/or storing electrical energy and/or electrons. Suitable batteries 16 may use electrical, chemical and/or electrochemical mechanisms for storage, for example.

ICE's 12 include broadly piston engines, positive displacement engines, inline engines, V-shaped engines, radial engines, rotary engines, combustion turbines, fuel cells and/or any other suitable motive device. Suitable fuels for ICE's 12 include, without limitation, hydrogen, natural gas, steam, gasoline, diesel, fuel oil, wood, coal, and/or any other suitable energy containing substance.

Those skilled in the art and guided by the teachings herein readily appreciate that references to EM 14, electric generator, electric machine and the like, refer to suitable devices for converting between at least one of electrical energy and/or mechanical energy. Desirably, the EM 14 receives electrical power to provide mechanical power and receives mechanical power to provide electrical power. Typically, but not necessarily, the EM 14 includes a motor electronic control unit ("ECU") controlling at least a portion of the electrical management functionality. The EM 14 may include more than one phase, such as, three phases.

One of the components in an HEV 10 is a device which controls how the power demand of the vehicle is met. In a typical hybrid with a parallel setup, the power required to propel the vehicle can be met by the EM 14, the ICE 12, or the combination of the two power sources. In a typical hybrid with a series setup, the power required to propel the vehicle is supplied by the EM 14 while the ICE 12 is used to recharge the battery 16. The vehicle power control unit ("PCU") 38 uses a control strategy ("CS") to govern the power production of the vehicle's subsystems including the EM 14 and the ICE 12.

The goal of the control strategy is to maximize the fuel economy and minimize emissions of the vehicle 10, but also consistently meet peak power demands and have acceptable transient response, such as, acceleration. Desirably, but not necessarily, the control strategy ensures smooth driveability. The consistency is ensured by a stable state of charge ("SoC") in the battery 16. Desirably, charge neutrality of the battery 16 is maintained over a longer driving profile with a suitable CS, for example.

According to certain embodiments of this invention, a number of methodologies have been developed as HEV CS's. For example, a CS utilizes the battery SoC as a Boolean switch to move back and forth between two operating states. In each of the two operating states, a set of rules ensure a fuel economy improvement and a charge stability is applied to the vehicle. Alternately fuzzy logic is applied to designing an HEV CS. Fuzzy logic offers strengths over a two state solution, since it allows for a continuum of states to be considered.

According to one embodiment of this invention, one fuzzy logic approach improves the efficiency of the ICE 12 by shifting ICE 12 operating points to a higher efficient region. The fuzzy logic control also may consider the SoC of the battery 16, so as to ensure a charge sustaining operation, for example, resulting in a CS with improved performance when the average power demand of the driving pattern is close to the peak efficiency of the ICE 12. Alternately, another approach tries to minimize the amount of fuel the ICE 12 uses in any time iteration while considering the SoC of the battery 16. These above mentioned CS's may not provide optimal operation of all driving conditions, such as, for example, an HEV 10 with a CS for urban stop and go traffic may not operate as efficiently when used for longer highway driving.

CS's can be developed using condition based control for various driving conditions, for example, during acceleration it is desired for the EM 14 to provide the power to avoid fast transients of the ICE 12 that inefficiently consume fuel. Therefore, this notion is coded into a Digital Signal Processor ("DSP") and/or any other suitable device 40 in the following manner: "IF the acceleration pedal is depressed x degrees, such as, at least about 5 degrees, ANDIF the battery SoC is of adequate charge, THEN the electric motor should supplement the ICE." This is true even for the fuzzy approaches, since here the same IF-THEN statement methodology is used.

According to an embodiment of this invention, the CS may be separated into two groups: causal and non-causal. The causal approaches are usually rule based. The rules are designed based on experience, expertise and/or trial and error. Not all the driving conditions which the vehicles will experience are known, so rules have to be based on approximations of what the vehicle is likely to encounter, for example. The rules can be implemented using a deterministic approach and/or a fuzzy approach.

A non-causal CS may optimize the operation of the power sources over a predefined driving cycle, such as, where the optimal reference torques for power converters and optimal gear ratios are calculated by minimization of a cost function, generally representing the fuel consumption or emissions. If this optimization is performed over a fixed driving cycle, a global optimum solution can be found, for example.

According to an embodiment of this invention, the non-causal approach is not used directly for real-time energy management. Simulated annealing, genetic algorithms, linear programming, game theory, optimal control theory and/or any other suitable technique are utilized to solve the CS problem, usually while constraining the change in the battery state of charge, for example.

Mathematical intelligence, such as, genetic algorithms ("GA"), particle swarm optimization ("PSO"), ant colony optimization ("ACO") and fuzzy logic methods are possible bases for CS algorithms. According to certain embodiments of this invention, due to the highly nonlinear and/or time varying nature of the vehicle application, as well as the complexity of the objective function, the HEV CS is a suitable application for mathematical intelligence approaches.

According to certain embodiments of this invention, the CS includes application of an artificial neural network ("ANN") 20 to the CS problem. The ANN 20 approach is very useful for applications, where pattern recognition is not possible without a human operator, for example. The driving conditions of the HEV 10 may vary a great amount, so it is difficult to optimize for every scenario through condition based control. ANN 20 is used to learn the desired control strategy characteristics from various existing control strategies to provide an optimized and/or better performing control strategy with the ANN 20 learning from the "experience" rendered by different control strategies.

According to an embodiment of this invention, ANN's 20 are used to find a high performance CS for an HEV 10 given a training set 26. The relationship between the inputs and outputs of any training set 26 can be found through mathematical derivations originating from fundamental physics equations that describe its components, for example. Optimized data points from different control strategies can be used to attain an adequate training set 26. When dealing with complex input/output relations, it is possible to reduce relation complexity by making approximations, such as, including engineering experience. Therefore, exact input/output relationships are usually not attained. On the other hand, the ANN 20 of this invention has the ability to learn exact input/output relationships without knowledge of any physics of the relationship. According to an embodiment of this invention, the optimized data points from a number of different CS's, are used to train a ANN CS to achieve improved fuel economy and reduced emissions.

Desirably, artificial neurons mimic the behavior of biological neurons 42. The composition of a biological neuron 42 typically includes a cell body 44, dendrites 46, a synapse 48, and an axon 50, as shown in FIG. 1*a*. Dendrites 46 are tentacle-like receptacles that receive signals from other neurons across synapses 48 and/or junctions. Extending from each neuron cell body 44, the axon 50 or single output fiber transmits and/or sends signals to the dendrites 46 of one or more other neurons 42. In the human brain billions of neurons 42 work in conjunction to allow for the distinction of countless sensations.

Figure 1B:
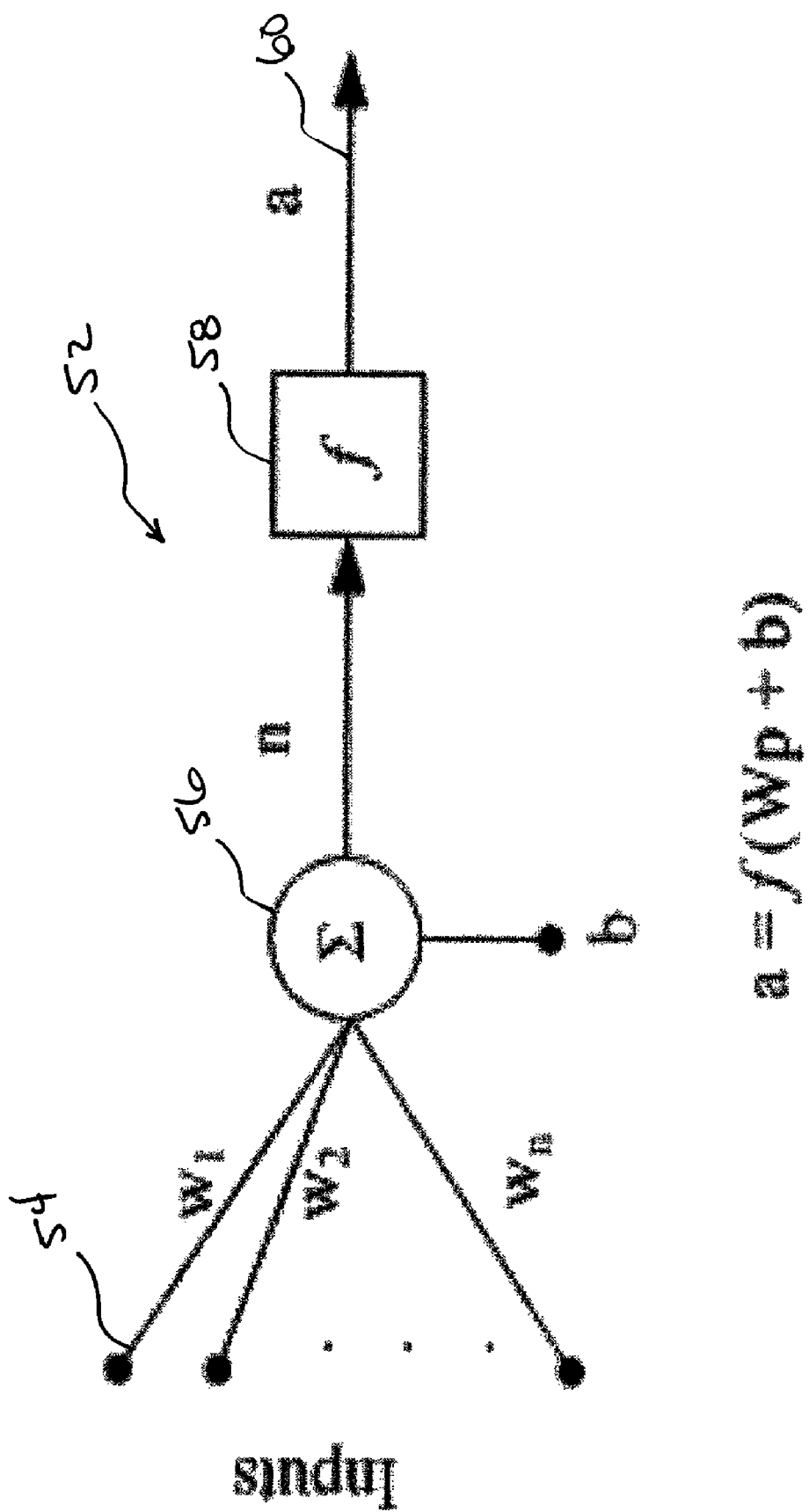
FIG. 1b shows a mathematical model of an artificial neuron, according to an embodiment of this invention.

FIG. 1*b* shows the mathematical model of an artificial neuron 52. The input weighting $(w_1, w_2, \ldots w_n)$ 54 replicates the function of the dendrites 46. The cell body 44 is formed by a summing junction 56 followed by a predefined function f 58 which acts on the summing junction 56 output n to form the neuron output a 60.

Any suitable number of artificial neurons 52 can be linked in series and/or parallel to form an ANN 20. These ANN's 20 may provide the function of biological networks, such as, at a much smaller scale. According to an embodiment of this invention, the main function of the ANN 20 is to differentiate between various inputs classes.

Figure 2:
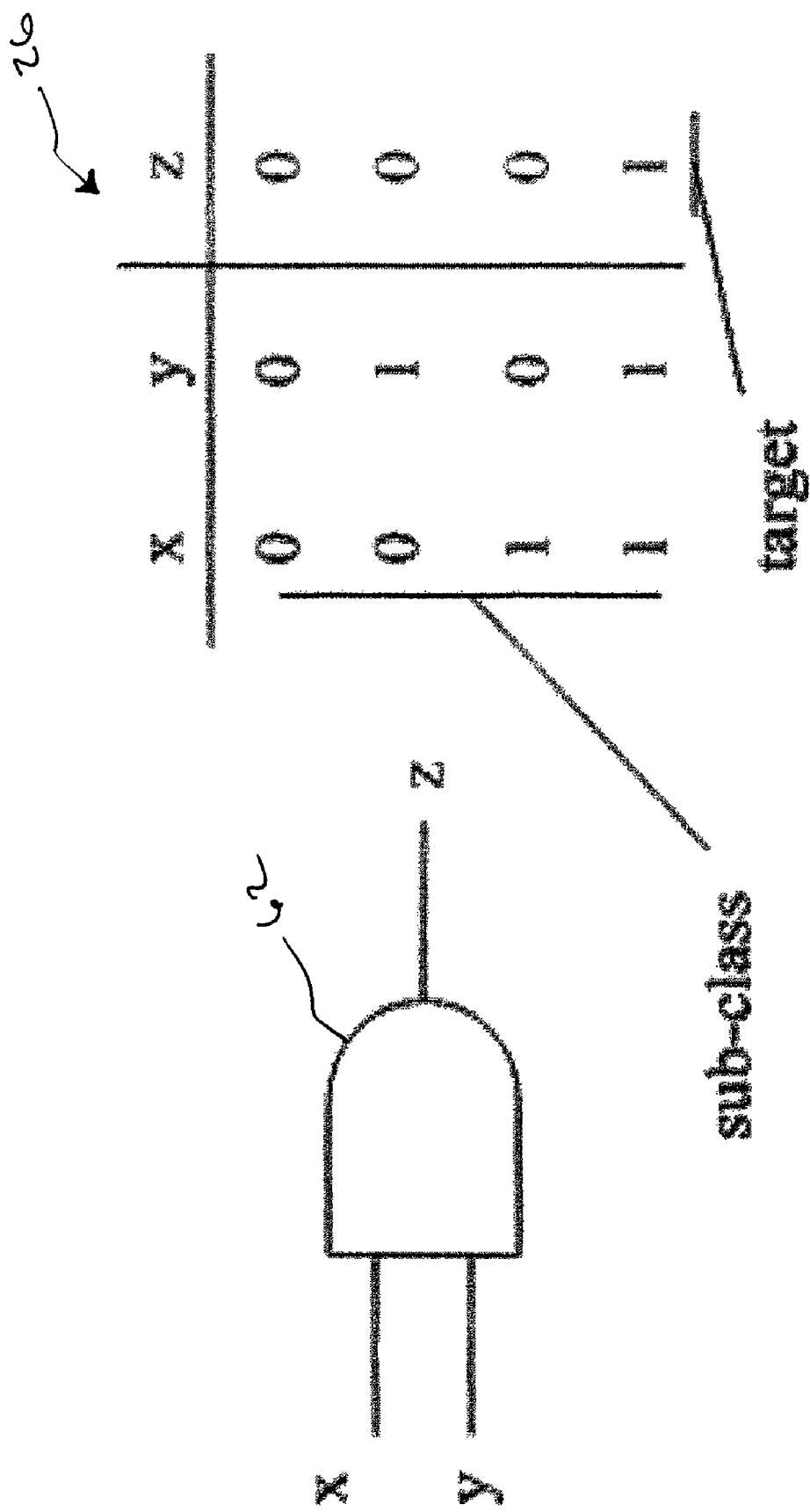
FIG. 2 shows a gate and truth table, according to an embodiment of this invention.

A simple example of subclass distinctions lies in the ANN 20 implementation of an AND logic gate 62. In that case, the ANN 20 must implement the AND gate 62 truth table as shown in FIG. 2, for example. The variables x and y are the input set while the output z is the target. Together x, y, and z are called the training set 26. An iterative process is employed which uses the training set 26 to assign appropriate weights and biases to the ANN 20 in order to achieve the appropriate target given one of the subclass inputs.

According to an embodiment of this invention, there are various learning algorithms that can appropriately assign weights and biases to an ANN 20. While training the ANN 20, a measure of accuracy is provided by the sum squared error ("SSE") as described in the following equation.

$$SSE = \sum_{q=1}^{Q} \sum_{i=1}^{S} (t_i(q) - a_i(q))^2,$$

where, $Q$ = number of subclasses and $S$ = number of neurons

Training algorithms include, without limitation, Levenberg-Marquardt, Levenberg-Marquardt optimization, backpropagation, Gradient descent backpropagation, Gradient descent with momentum backpropagation, Gradient descent with adaptive learning rate backpropagation, Gradient descent with momentum & adaptive learning rate backpropagation and/or any other suitable method of teaching the relationships of input and/or outputs. These different techniques are characterized by their rate of convergence and stability.

Learning Algorithms include, without limitation, Gradient descent with momentum weight/bias learning function, Gradient descent weight/bias learning function and/or any other suitable method of improving the ANN.

Figure 3:
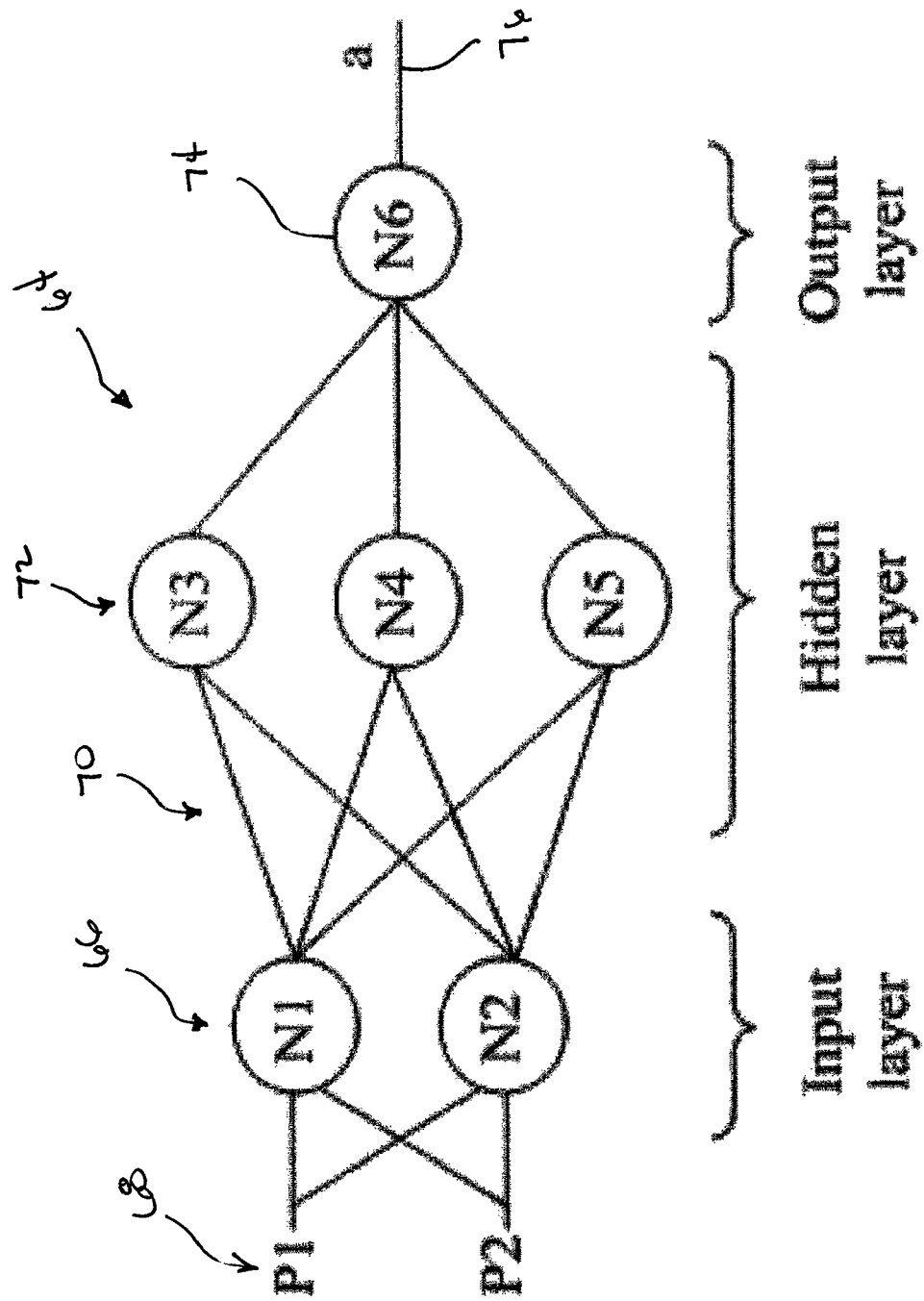
FIG. 3 shows an artificial neural network, according to an embodiment of this invention.

Size and architecture of an ANN 20 directly affects the ability of the ANN 20 to minimize the SSE to a reasonable quantity after a finite number of iterations or epochs 36, for example. When many input classes are to be distinguished with an ANN 20, a multilayer array of neurons 64 is needed. Any suitable number of layers for the ANN 20 is possible. According to an embodiment of this invention, a three-layer ANN 64 is used, as shown in FIG. 3. At the left hand side, the input layer 66 accepts the input classes 68 and prorogates its output 70 to the hidden layer 72. A larger number of hidden layer neurons 72 will allow for more subclass distinction capabilities; however, having too many neurons in the hidden layer 72 can result in undesired effects and/or inefficiencies. After the hidden layer 72, the output layer 74 further manipulates the signals from the hidden layer 72 to produce the output 76 which completes the function of the ANN 20.

According to an embodiment of this invention, to be able to provide the best training set for the ANN, numerous CS's which are optimized to give maximum fuel economy for the widest range of driving conditions need to be considered.

Figures 4A, 4B:
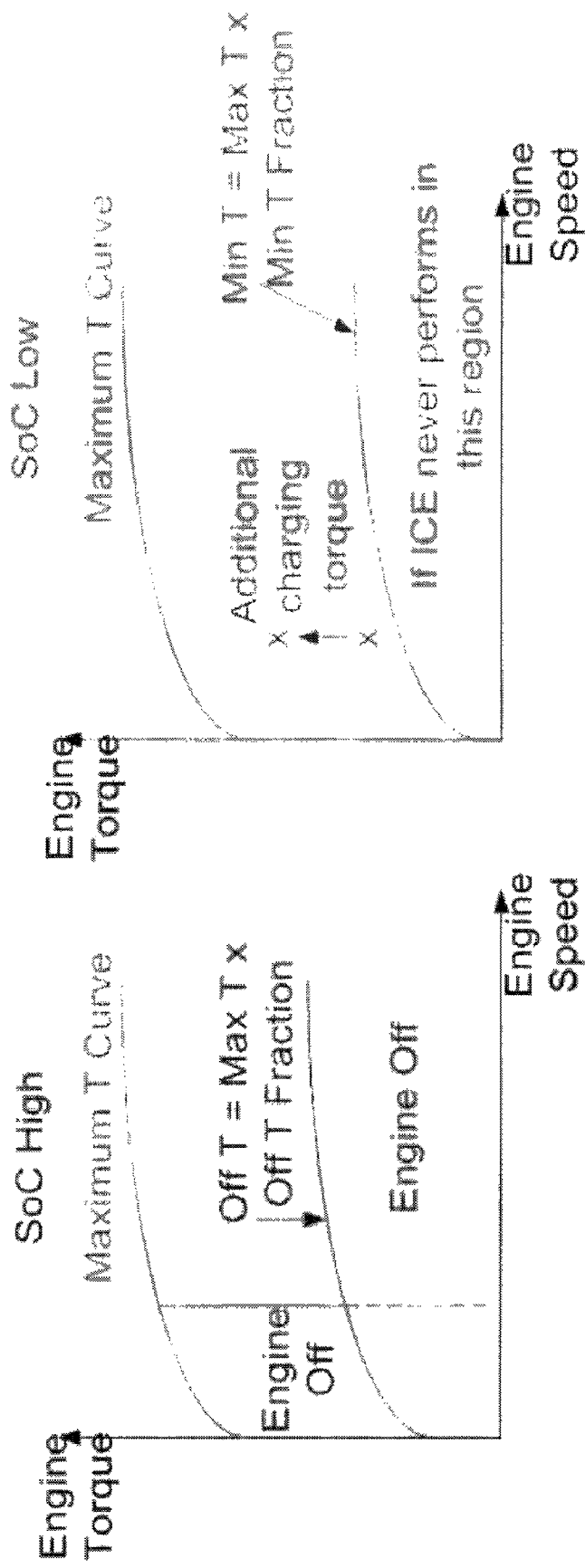
FIG. 4a shows a graphical representation of the control strategy, according to an embodiment of this invention.
FIG. 4b shows a graphical representation of the control strategy, according to an embodiment of this invention.

As discussed above, one control method fluctuates between two operating states depending on the battery 16 SoC. This CS may also be referred to as a "two-mode" HEV control. This ensures operation of the vehicle will be charge sustaining over a long period of time and SoC will converge to the threshold value when alternating states. If the battery 16 SoC is above the threshold value, the engine 12 will be switched off and the electric motor 14 will provide the required power. If the battery 16 SoC falls below the threshold, the engine 12 is kept on and an additional torque load is put on the engine 12 to recharge the battery 16 to the ICE 12 from operating at inefficient low torque ranges. The operation of the CS is shown diagrammatically in FIGS. 4a and 4b, for example.

Due to the highly nonlinear and/or time varying nature of the power plant, fuzzy logic is used extensively as the backbone of many CS's, for example. According to an embodiment of this invention, one CS defines the torque that the ICE 12 provides at any one speed based on the torque that gives the maximum efficiency of the ICE 12. This CS may also be referred to as a "maximize ICE efficiency" HEV control. The speed of the ICE 12 is fixed since the vehicle speed is a constant at any one time and the transmission is in a defined gear set by the vehicle speed. The remainder of the torque is either provided or absorbed by the batteries 16 with the EM 14. Since the most efficient operation of the motor 14 is at high torque operation, the ICE 12 will be working "hard" most of the time. The torque demand on the ICE 12 is determined by the vehicle power demand and the SoC of the vehicle. After defuzification, a discrete value is given as the torque demand.

Figure 5:
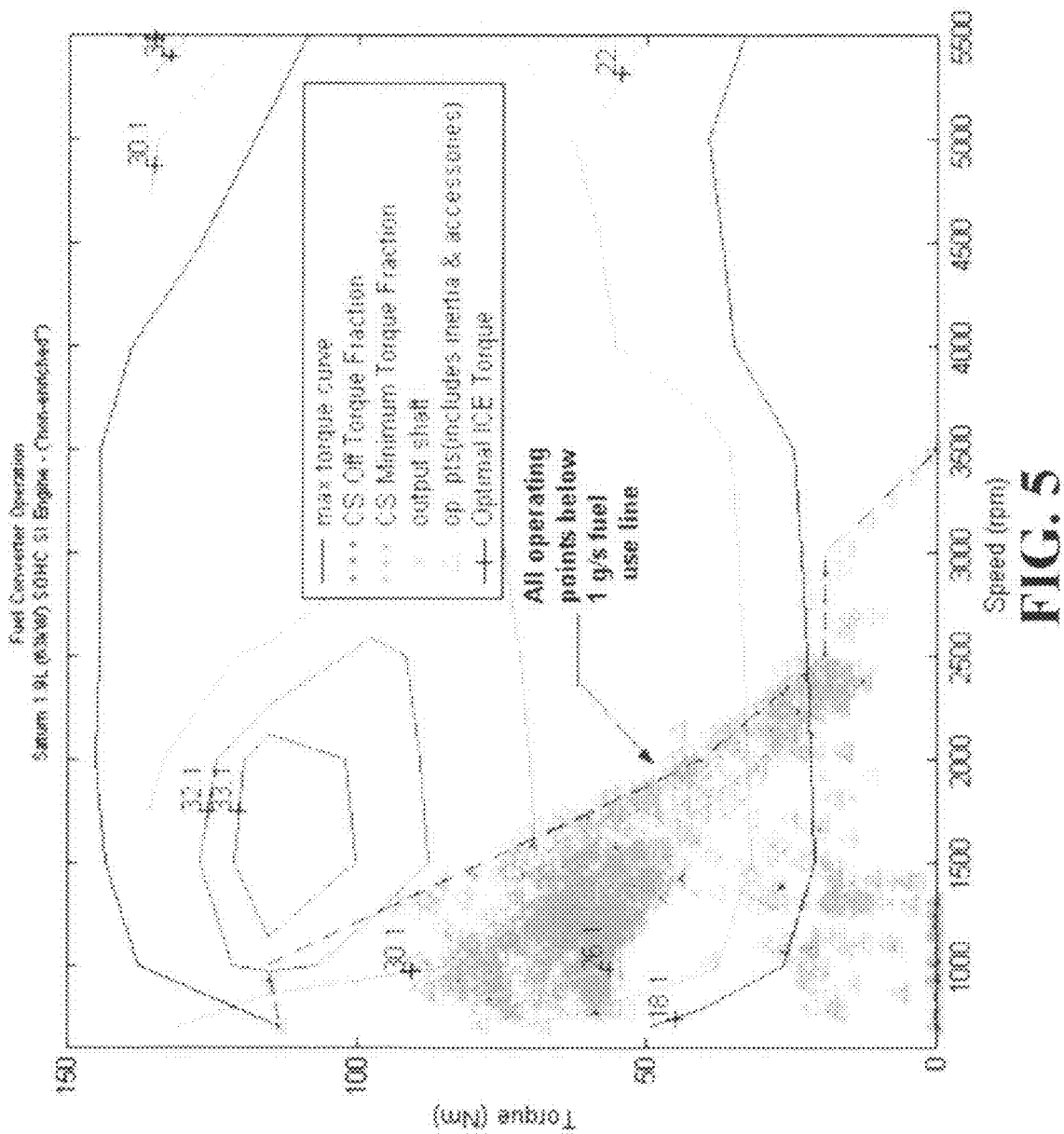
FIG. 5 shows a plot of operating points for the internal combustion engine, according to an embodiment of this invention.

The CS of this embodiment of the invention is good for vehicles 10 with engines 12 whose maximum output power is close to the average of the driving cycle, for example. Therefore, this CS will give good performance for driving patterns where the average power demand is high, such as highway driving. A plot of typical operating points of the ICE 12 is shown in FIG. 5, for example. The peak efficiency line shown in the figure depicts the most efficient operating torque over all engine speeds. Desirably, all and/or most of the operating points will fall on the peak efficiency line. The driving pattern with the most points on the peak efficiency line is an optimal CS for that driving pattern, for example.

Figure 6:
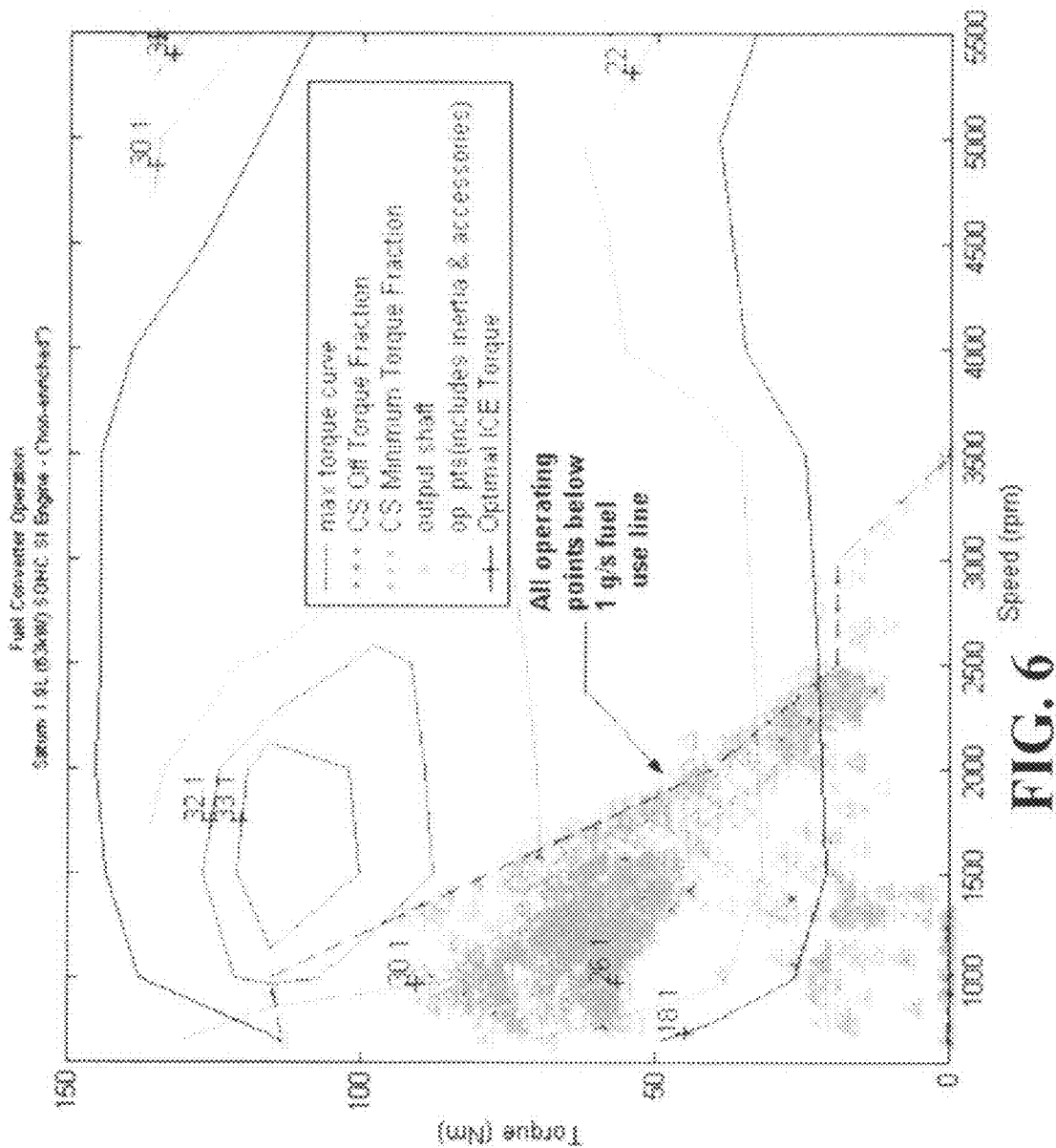
FIG. 6 shows a plot of operating points based on fuel consumption, according to an embodiment of this invention.

According to another embodiment of this invention, another fuzzy logic approach tries to minimize the amount of fuel that is consumed in any one time step. Alternately, maximum fuel consumption per second can also be defined. This CS may also be referred to as a "minimize fuel consumption" HEV control. This is shown in FIG. 6 to be 1 gram/second, for example. This strategy is straight forward because if the amount of fuel consumed per second is minimized, the fuel economy will be maximized. Again, the fuzzy logic approach also considers the SoC as one of the membership functions, which ensures the charge sustainability property of the CS. Since this CS looks at the current fuel consumption, large SoC swings may occur because the CS will use more of the motor power to minimize the fuel consumption until the battery state of charge falls.

For all three cases studied above, the CS's may not be optimal for all and/or varying driving conditions. According to an embodiment of this invention, an ANN combines the optimized operation points of numerous control strategies into one control strategy to provide an optimum over the entire operating range of the HEV. Driving profiles may include city driving, highway driving, combinations thereof and/or any other suitable scenario. Driving styles may include aggressive, passive, speeder and/or slowpoke, for example.

Figure 7:
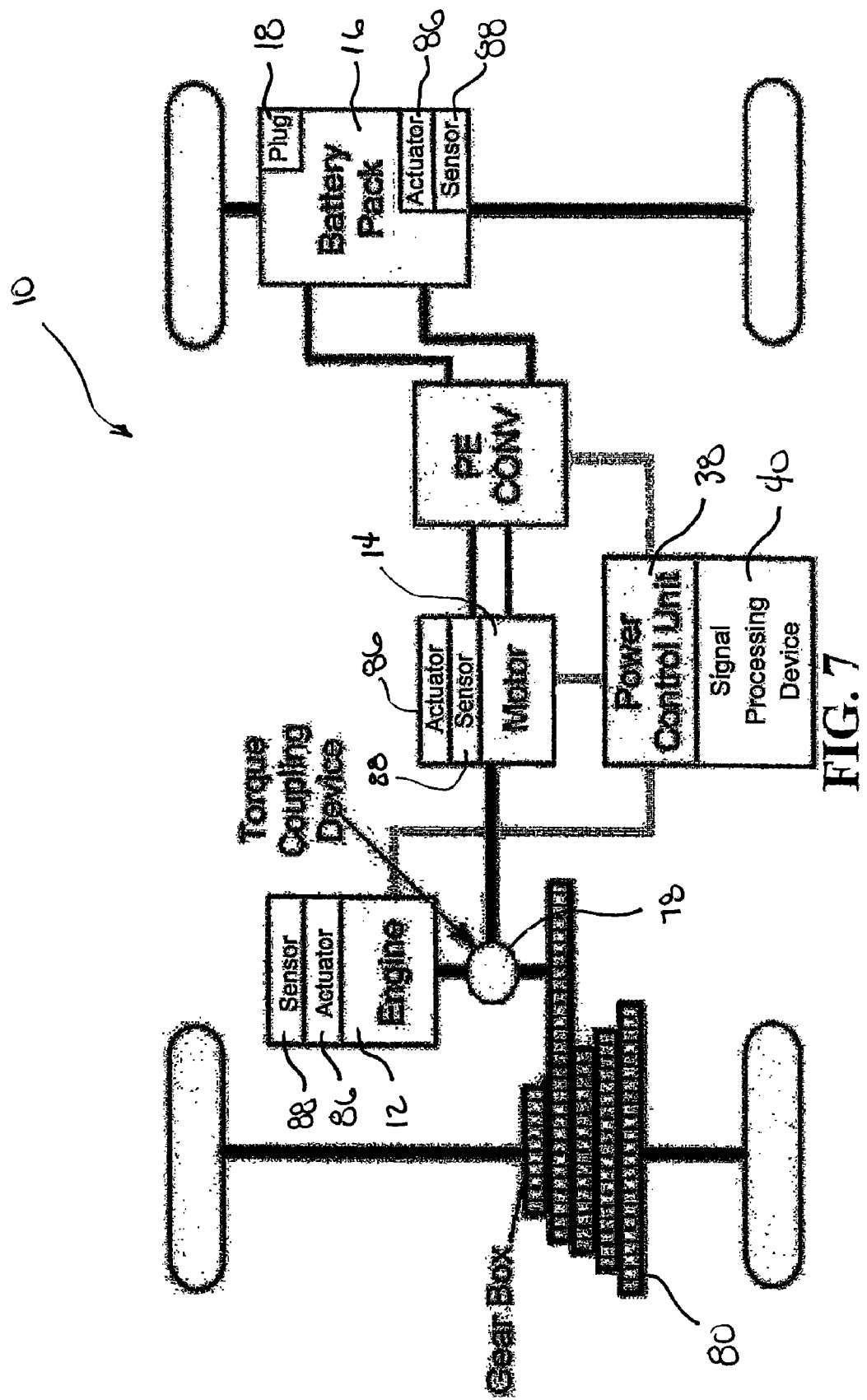
FIG. 7 shows a schematic of a hybrid electric vehicle, according to an embodiment of this invention.

In order to evaluate the feasibility and benefit of the CS of this invention, a vehicle 10 on which the simulations were performed was characterized. The layout or schematic of the vehicle 10 is shown in FIG. 7, for example. This is a typical parallel HEV 10 where the ICE 12 and the EM 14 torques are coupled by a torque coupling device 78. This device 78 has the ability to sum the torques of the two power sources and output the torque onto the gear box 80. The speeds of the two machines are determined by the vehicle speed and the gear ratio of the transmission. This means that the speed of the engine 12 and the motor 14 is defined by the speed of the vehicle 10 and the gear that the gearbox 80 is in.

The PCU 38 sends signals to the EM 14 as to how much power it needs to provide and also it signals the engine control unit 38 about the state of the ICE 12 as well as the amount of torque that is expected from the ICE 12. The other parameters of the HEV 10 are given in FIGS. 16 and 17, respectively as Tables I and II. The choice of the vehicle components may be similar to a stock hybrid Toyota Prius, for example. A hybrid Toyota Prius typically includes a planetary gear set to allow the engine and the motor to spin at any speed and provide the CS another degree of freedom.

Figure 8:
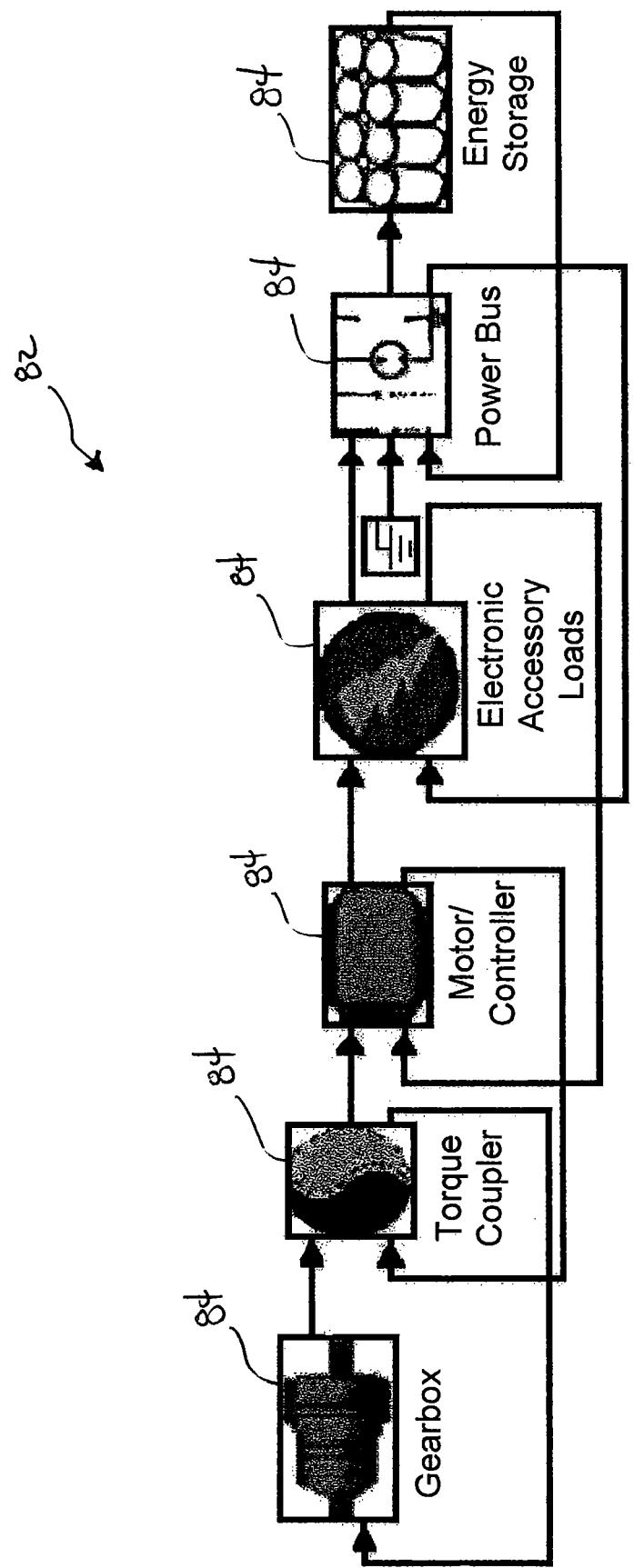
FIG. 8 shows a block diagram of a hybrid electric vehicle, according to an embodiment of this invention.

HEV's consist of many complex subsystems that work together to propel the vehicle. According to an embodiment of this invention, to be able to investigate the suitability of a CS there needs to be a way to simulate the operation of each of these subsystems, such as, for example, using the advanced vehicle simulator ("ADVISOR™") software. This software uses the mathematical software and a simulation environment to emulate vehicle subsystems based on a combination of a subsystem model and empirical data gathered from component testing. Each of the vehicle's subsystem is simulated using a separate block 84, with a set of inputs and outputs. These blocks are then put together to build a vehicle 82, as shown in FIG. 8, for example.

Figure 9:
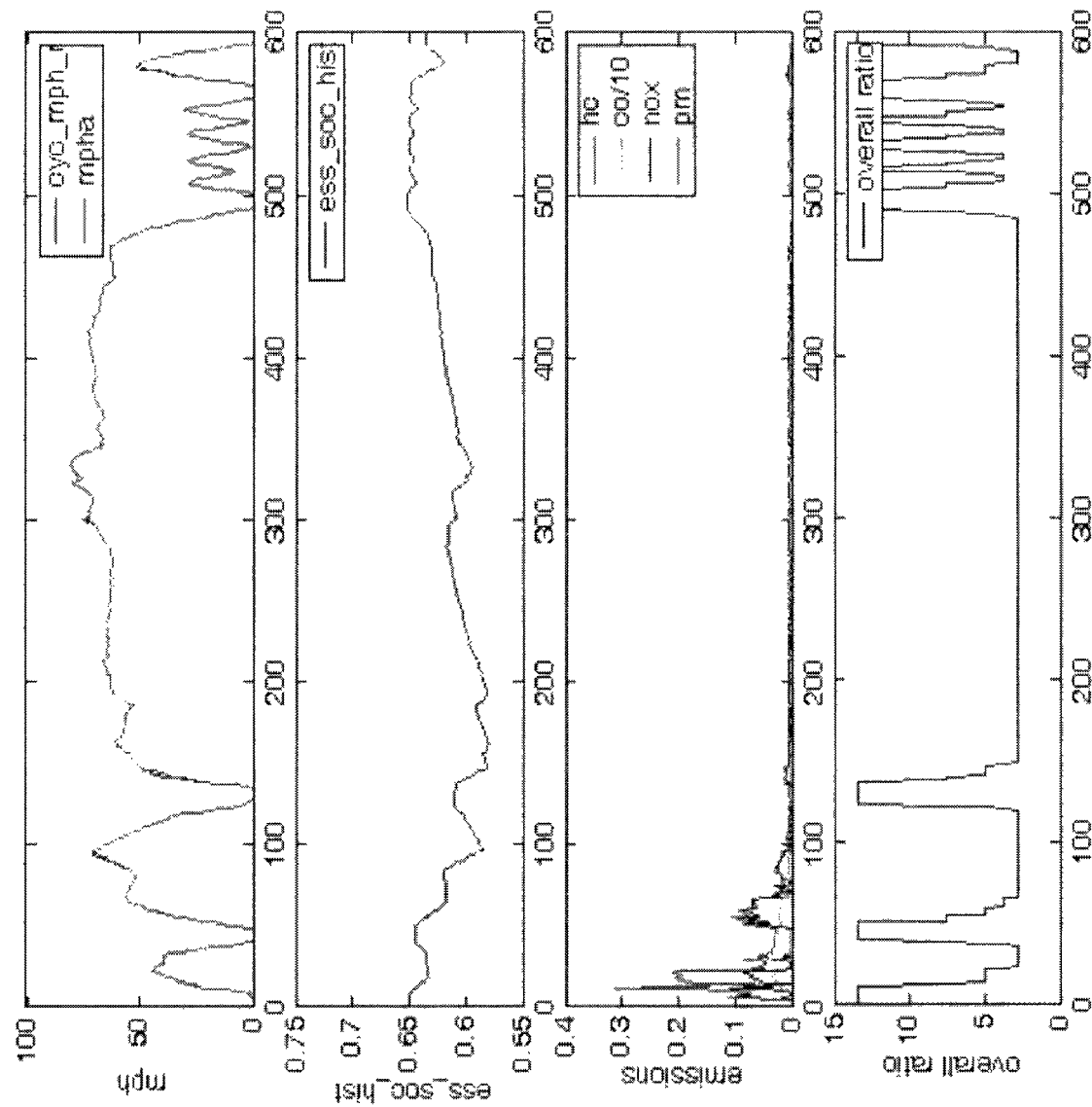
FIG. 9 shows a plot of simulation results, according to an embodiment of this invention.

The vehicle 82 may then be simulated over a driving regimen which defines the speed versus the time trace that the vehicle needs to follow. Some sample simulation results are shown in FIG. 9, for example. A forward calculation path is used to determine how much energy each subsystem 84 needs to provide to be able to meet the required power demand. Then the system limits are imposed through a backward loop. These two loops are executed at every time step as the simulation progresses through the driving pattern. The block diagram of the subsystems and their interconnections in a parallel hybrid according to an embodiment of this invention is shown in FIG. 8. According to an embodiment of this invention, the control block is replaced by an ANN 20 which uses the same inputs and optimized outputs based on a combination of other CS's.

According to an embodiment of this invention, an HEV 10 including an EM 14, a battery 16, an ICE 12 and a power control module 38 having an adaptive control unit ("ACU") 40 for interfacing with sensors 86 and actuators 88 of the EM 14, the battery 16 and/or the ICE 12. The adaptive control unit 38 includes an ANN 20 adapted to changing driving conditions or patterns.

The power control module 38 includes wiring, electrical components, processors, microchips, circuits, processors, computers, logic devices, comparators and/or any other suitable apparatus for executing and/or calculating at least a portion of the HEV control strategy or scheme, such as, in a digital and/or an analog mode.

Desirably, the ACU 40 includes capabilities and/or functionality to change and/or adapt, such as, to changing driving conditions and/or patterns. In other words the ACU 40 includes the capabilities to execute a different algorithm or process depending upon inputs. The CS in the ACU 40 may periodically update and/or learn, such as, at any desired interval, for example, once a quarter, once a month, once a week, once a day, once an hour, once a minute, once a second and/or any other suitable frequency. According to other embodiments of this invention, the ACU 40 includes a static processing mode that is not updated.

According to an embodiment of this invention the ACU 40 includes a DSP, a micro-processor, a field programmable gate array and/or any other suitable device or apparatus.

According to an embodiment of this invention, the ACU 40 unit seeks and/or optimizes to maximize fuel economy, minimize emissions, meet peak power demands and/or provide acceptable transient response during changing driving conditions. Changing driving conditions include urban profiles, highway profiles and/or any other suitable traveling scenario and/or experience.

Sensors 86 broadly may include a speedometer, a tachometer, a fuel flow meter, a strain gauge, an emissions monitor and/or any other suitable instrument or device associated with a least a portion of the HEV 10 to monitor, measure, read and/or generate a signal corresponding or related to a parameter, a variable and/or any other suitable characteristic of the HEV 10 and/or the driving conditions of the HEV 10.

Actuators 88 or drivers may broadly include an EM control unit, an ICE control unit, a brake system, a linkage and/or any other suitable device to receive a signal from the ACU, such as, for example, to increase the output of the EM.

According to an embodiment of this invention, the HEV includes a torque coupler 78, such as, for example a planetary gear, a transfer case, a through-differential and/or any other suitable device for summing and/or distributing forces.

The ANN 20 may include any suitable number of layers 66, 72, 74 and any suitable number of neurons 52. Generally too few layers 66, 72, 74 or neurons 52 will lack the desired capabilities and too many may result in an unstable CS, for example. According to an embodiment of this invention, the ANN 20 includes an input layer 66 having about 5 to about 50 neurons 52 and more specifically about 20 neurons 52, a hidden layer 72 having about 5 to about 50 neurons 52 and more specifically about 20 neurons 52 and an output layer 74 having about 1 to about 10 neurons 52 and more specifically about 1 neuron 52.

Desirably, the ANN 20 improves fuel economy by at least between about 1 percent and about 7 percent above a constant causal based control scheme and move specifically by at least about 6 percent.

The CS of this invention may include a training set 26 having any suitable number of points based on and/or a function of various or different driving scenarios and/or conditions along with any suitable number and/or combination of CS's and/or algorithms. According to one embodiment of this invention, the training set 26 is based on changing driving conditions or profiles for training the ANN 20. According to another embodiment of this invention, the training set 26 includes input and output values based on highest fuel economies for various driving conditions and control schemes.

According to an embodiment of this invention, the training set 26 is acquired as follows. One specific vehicle is chosen and programmed to operate under different control strategies. For each control strategy, the vehicle is operated over city, highway and other city-highway combined drive cycles. For each of these drive cycles, the particular control strategy that resulted in the highest fuel economy is chosen and its operating points are taken as part of the training set 26. Operating points can be taken at any desired interval throughout the drive cycle, such as, every one second to monitor the state of charge of the battery, the speed of the vehicle, the commanded torque of the driver and/or the torque produced by the engine, for example.

Desirably, but not necessarily, a pre-processing algorithm operates on the training set 26, such as, to reduce repetitive row vectors.

This invention also comprehends a method of operating an HEV 10. According to one embodiment, the method includes providing a hybrid electric vehicle 10 having an ACU 40, wherein the ACU 40 includes an ANN 20. The method includes receiving and/or getting input signals and/or communications from sensors 86 and/or instruments of the HEV 10. The method includes calculating and/or obtaining output signals in the ACU 40 based on or including maximizing fuel economy, minimizing emissions, meeting peak power demands and/or providing acceptable transient response during changing driving conditions. The method includes sending and/or transmitting output signals or instructions to an ICE 12 or an EM 14 of the HEV 10, for example.

Desirably, but not necessarily, the method includes the ANN 20 seeking to maximize fuel economy, minimize emissions, meet peak power demands and/or provide acceptable transient response during changing driving conditions or profiles including urban use, highway use and/or combinations thereof.

According to another embodiment the method includes training the ANN 20 with a training set 26 having various driving conditions or profiles for a sufficient number of epochs 36 and/or intervals. Any suitable training algorithm 32 and/or learning algorithm 34 is possible, such as, a Levenberg-Marquardt training algorithm and a gradient descent learning algorithm with momentum weight/bias.

According to an embodiment of this invention, the method includes periodically updating the step of calculating based on time, age, wear of drivetrain components and/or any other suitable factor or variable.

This invention further comprehends a control scheme for an HEV 10 including an EM 14 and an ICE 12, the control scheme wherein the control scheme includes an adaptive control strategy executing in an ANN 20 to receive input signals, optimize the HEV 10 and produce output signals to at least one of the EM 14, the transmission 78, 80 and/or the ICE 12.

EXAMPLE

Figure 10:
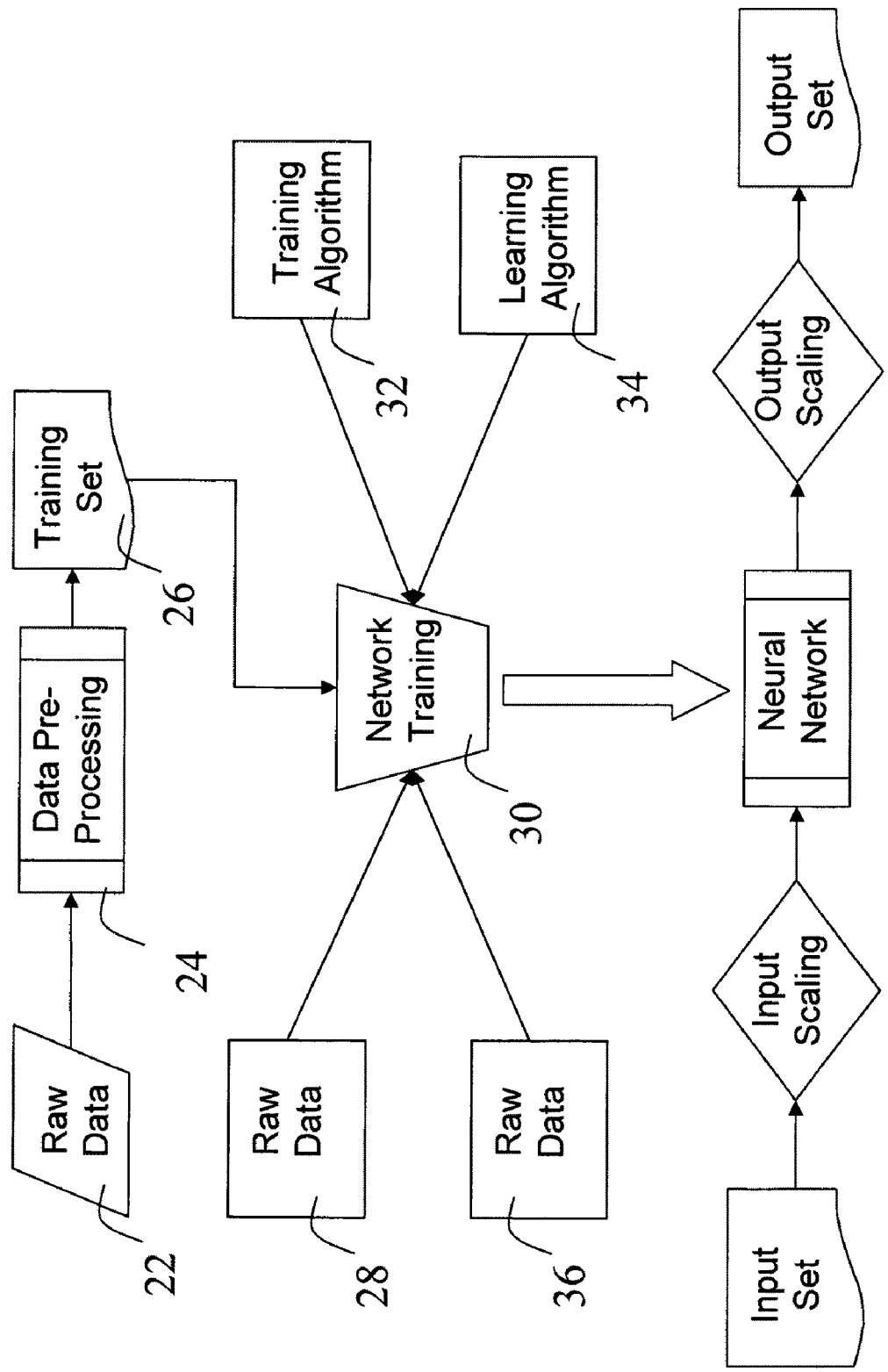
FIG. 10 shows a diagram of steps to implement the artificial neural network, according to an embodiment of this invention.

According to an embodiment of this invention, several steps were taken to implement an HEV 10 CS with an ANN 20. Those steps range from defining an adequate training set 26 to determining the ANN 20 size and architecture. FIG. 10 shows the major design aspects carried out for an embodiment of this invention. The first step was to attain and preprocess a raw data set 22 so as to attain a training set 26 for the ANN 20. The number of layers 66, 72, 74 and the number of neurons 52 was specified in the network size 28 along with the training algorithm 32 and the learning algorithm 34. Once those parameters were specified the ANN 20 was trained with network training 30 and integrated into ADVISOR™, as discussed above.

Figure 11:
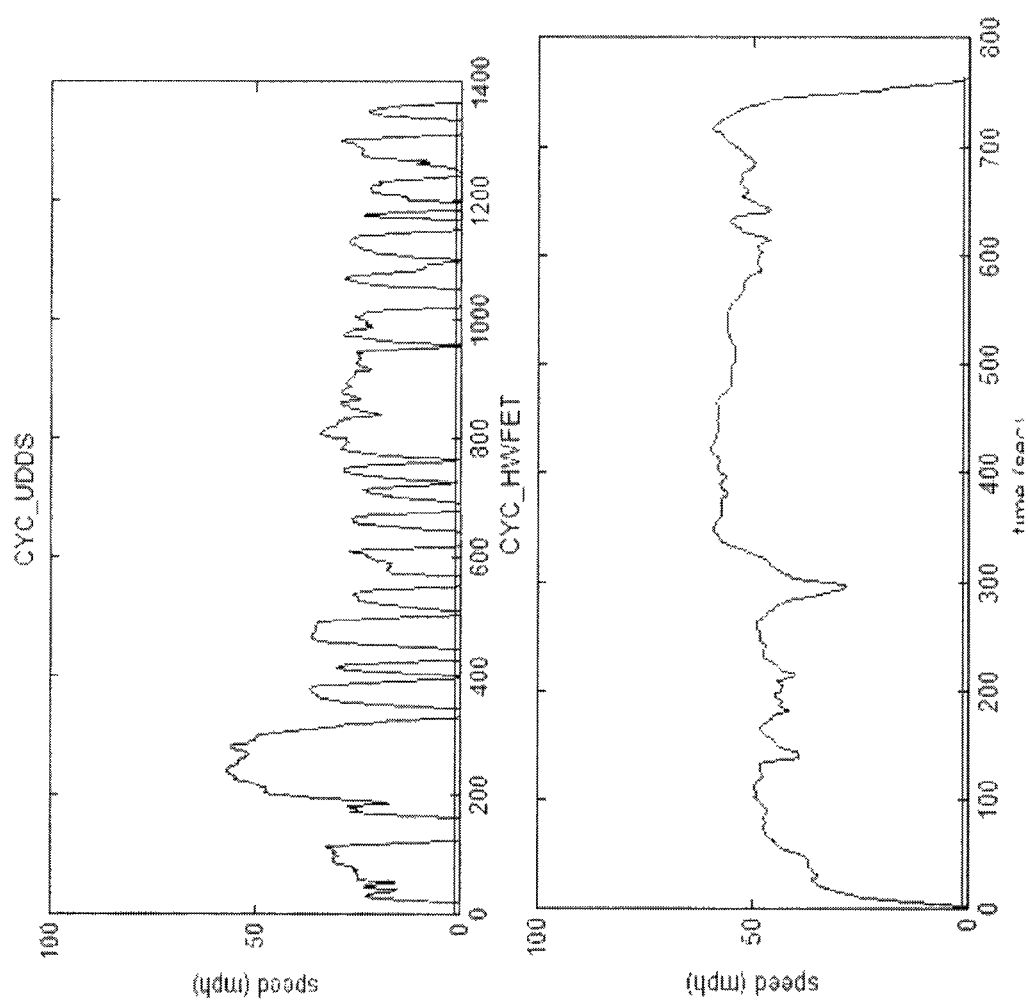
FIG. 11 shows a plot of driving patterns, according to an embodiment of this invention.

The goal was to extract the optimized operating points for a given control. The approach taken was to simulate the operation of a single vehicle, as defined in FIGS. 16 and 17 as Tables I and II, over a number of driving cycles, using various CS's. The driving patterns considered represent those used by the Environmental Protection Agency ("EPA") and as shown in FIG. 11, for example. Driving patterns also included some very urban driving patterns, namely New York City Cycle ("NYCC") and a MANHATTAN driving pattern. As shown in FIG. 18 as Table III, the efficiency mode control strategy shows the best results for city-like driving which was optimized for city driving. On highway profiles, parallel assist control is superior, so the parallel assist data points on the HWFET driving cycle will be included in the training set 26. The optimal control method depends on factors, such as, for example, the driving pattern.

Figure 12:
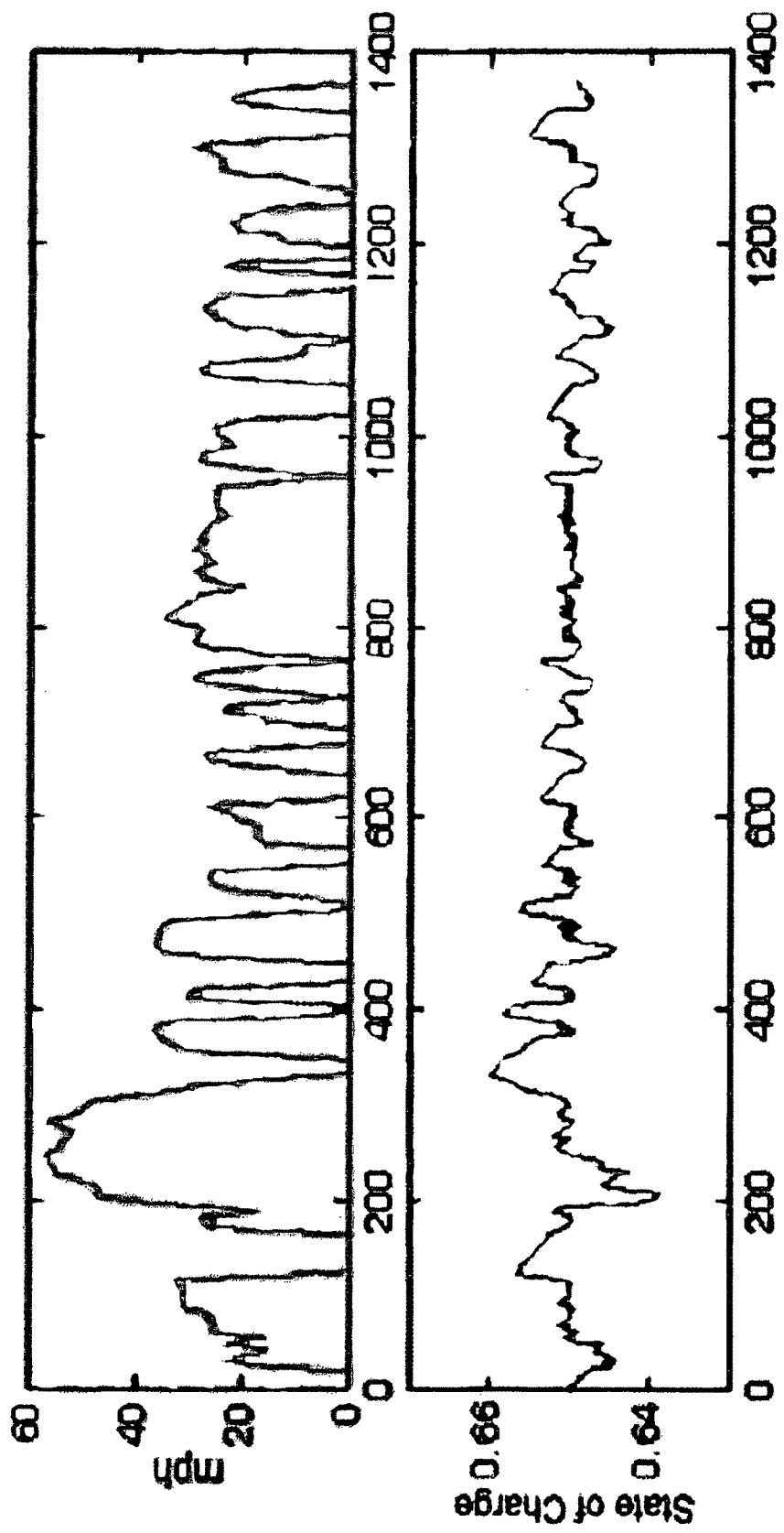
FIG. 12 shows a plot of the state of charge, according to an embodiment of this invention.

According to an embodiment of this invention, one constraint that was placed on the simulations was that the difference between the initial and final SoC cannot be more than 2% for the data to be included in the training set. This ensures that no "free" energy was boosting the fuel economy numbers and that the data points that were considered will not cause system instability, by allowing the battery to be over discharged or overcharged. Typical SoC pattern over a driving cycle for data that was included in the training set is shown in FIG. 12, for example.

FIG. 18 with Table III summarizes the fuel economies attained for various drive cycles attained using three CS's. The task at hand was to develop an ANN to serve as a CS that would achieve the highest fuel economy over all the drive cycles tested based on the "correct" training. The approach taken was to extract the input\output set from the highest fuel economy achieved for each of the four drive cycles. The UDDS, NYCC, and MANHATTAN had the highest efficiency when managed by the efficiency mode CS.

The driving patterns considered represent those used by the Environmental Protection Agency ("EPA"), including the Urban Dynamometer Driving Schedule ("UDDS"), the Highway Fuel Economy Test ("HWFET"), the New York City Cycle ("NYCC") and MANHATTAN driving pattern. Other driving patterns, simulations, scenarios and/or cycles are possible.

For the HWFET drive cycle, the parallel assist CS achieved the highest fuel economy. Those skilled in the art and guided by the teachings herein will recognize that the above method of selecting an optimized data set is applicable to any number of different CS's.

According to an embodiment of this invention and as shown in FIG. 10, the simulated input/output sets from the highest fuel economy CS's were extracted as the raw data 22 used to create a training set 26 for the ANN CS. An excerpt from the raw data list is shown in FIG. 19 as Table IV. The raw data consisted of over four thousand four column row vectors.

As shown in FIG. 10 and an effort to refine and reduce the size of the raw data 22, a data pre-processing algorithm 24 was employed.

Figure 13:
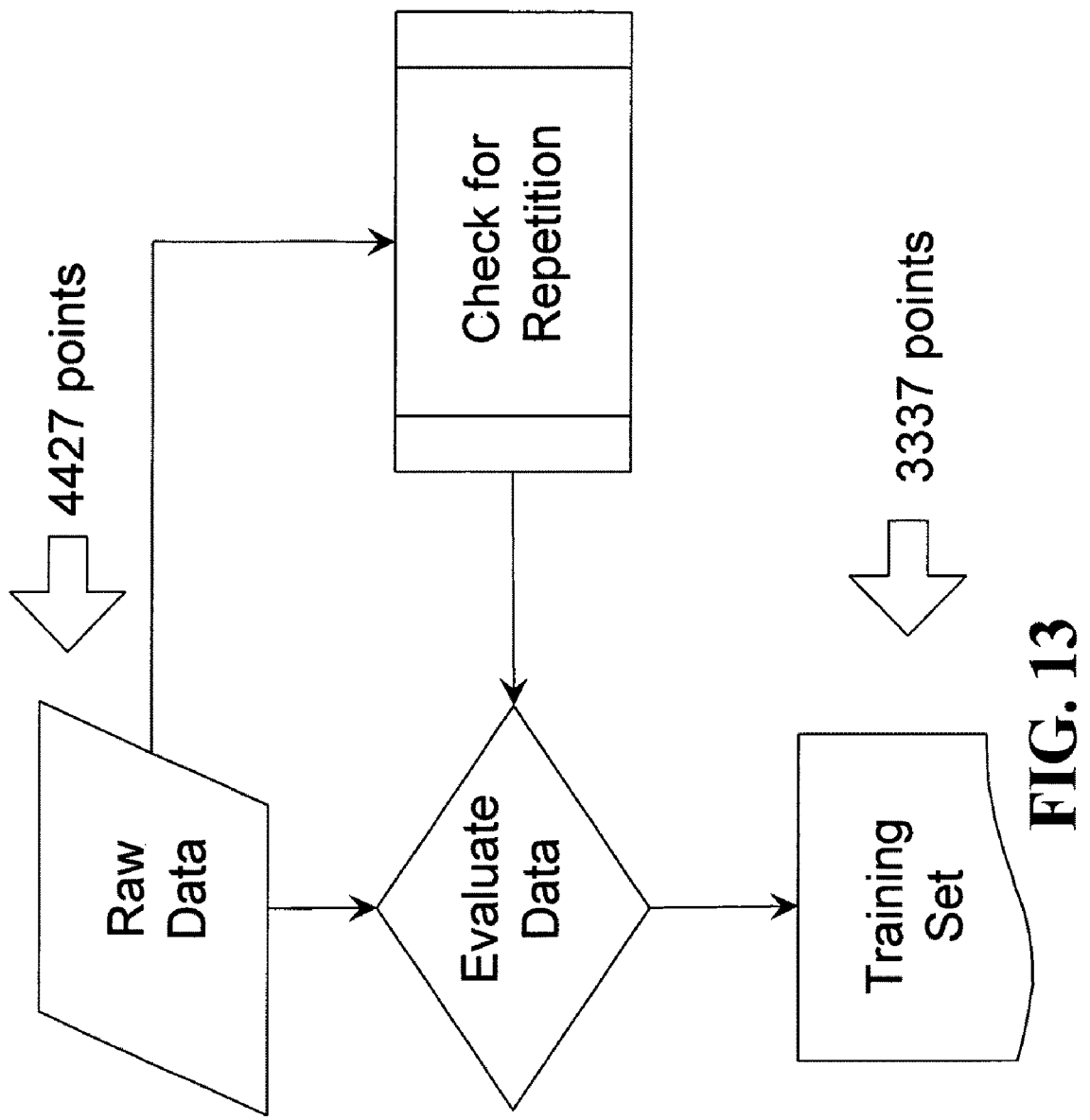
FIG. 13 shows a schematic of the pre-processing algorithm, according to an embodiment of this invention.

As shown in FIG. 13, the pre-processing algorithm reduced the training set by roughly 25% by eliminating any repetitive row vectors from the raw data set. This greatly reduced the time required to train the final ANN used as the HEV CS.

As shown in FIG. 10, after finalizing the training set 26 for the ANN 20, several parameters had to be chosen ranging from the network size 28 and/or architecture to the training algorithm 32 to be used. Several multilayer networks were tested and their performance was tested with plots of the SSE, as defined by the above equation vs. epoch. The final multilayer ANN 20 used was composed of twenty neurons 52 at the input layer 66, another twenty neurons 52 in the hidden layer 72 and a single neuron 52 at the output layer 74. The functions utilized were tansig, tansig, and pureline for the input 66, hidden 72 and output layers 74 respectively. This was done since the tansig-pureline combination theoretically has the ability to approximate any linear and/or non-linear input/output relation. Use of other functions or mathematical relationships and/or combinations of functions is possible.

Figure 14:
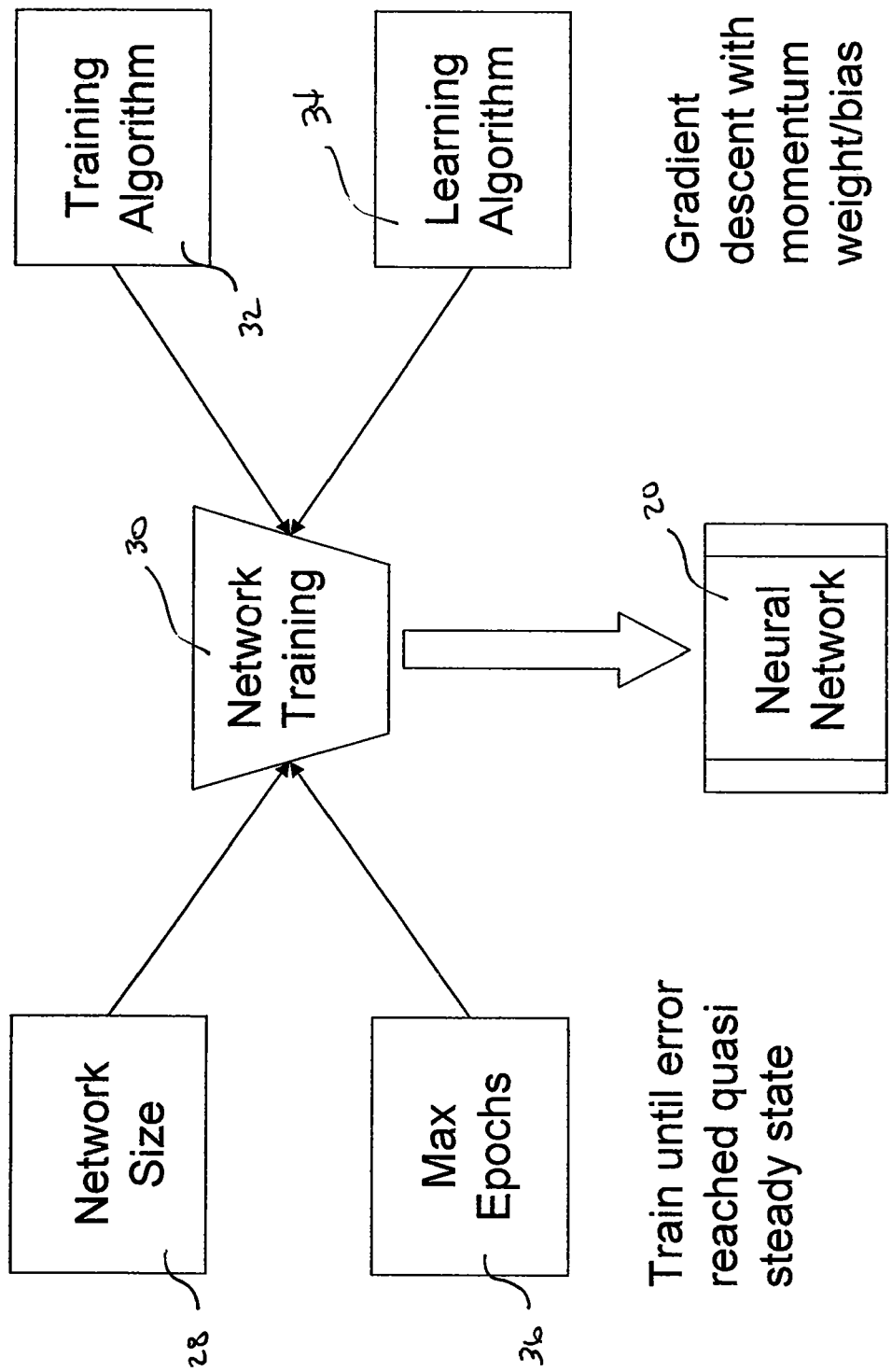
FIG. 14 shows a diagram of parameters for the control scheme, according to an embodiment of this invention.
Figure 15:
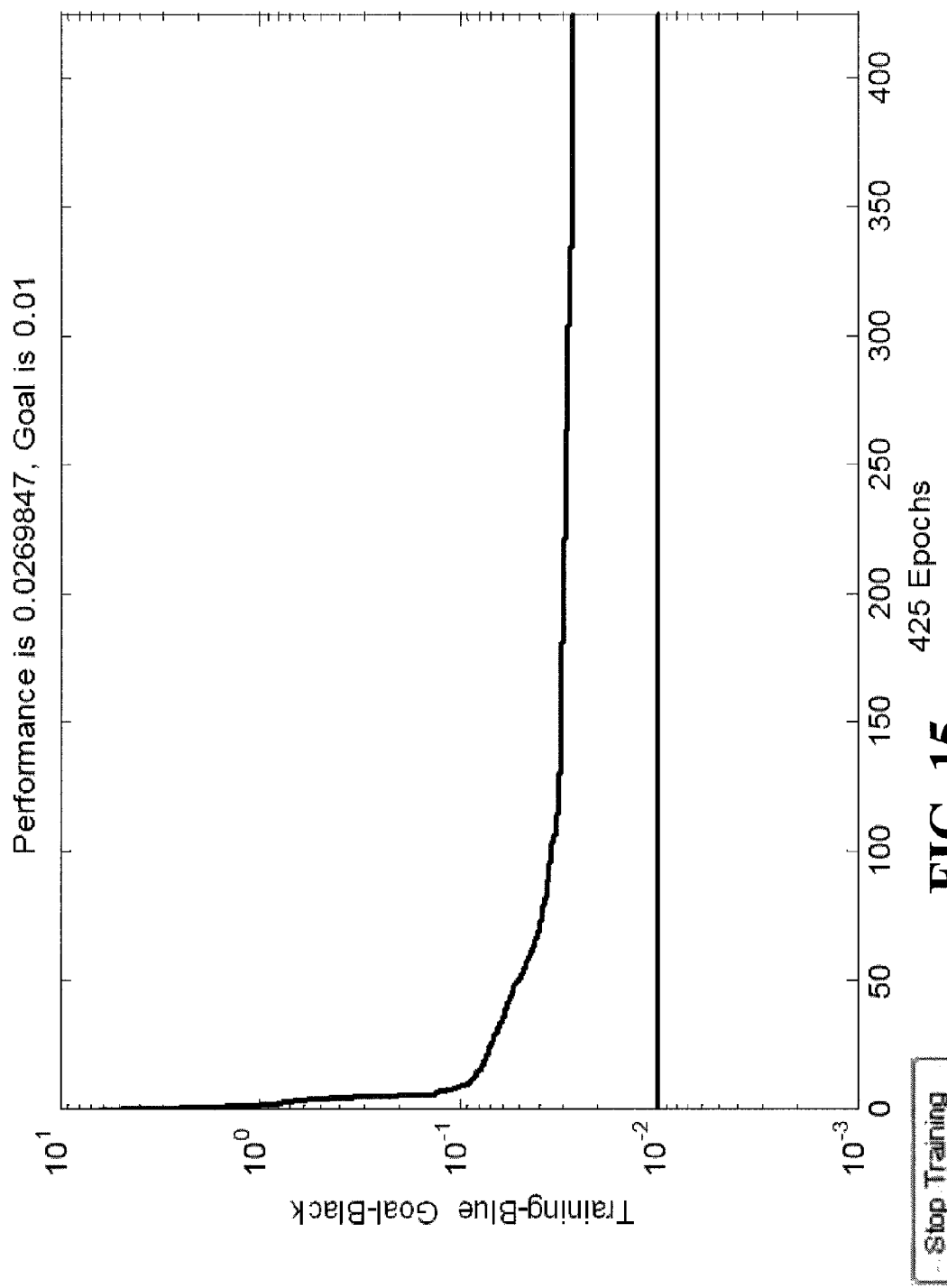
FIG. 15 shows a plot of the sum squared error, according to an embodiment of this invention.

The number of epochs or max epochs 36 during network training 30 was limited by the change in SSE vs. epoch. In other words, once the error seemed to level towards a minimum, the training was halted resulting in suitable weights and biases. The training algorithm 32 and the learning algorithm 34 used were the Levenberg-Marquardt and the Gradient descent with momentum weight/bias, respectively. FIG. 14 summarizes the ANN parameters used for the CS. The SSE observed for the weights and biases from training is plotted vs. epoch number in FIG. 15.

Figure 21:
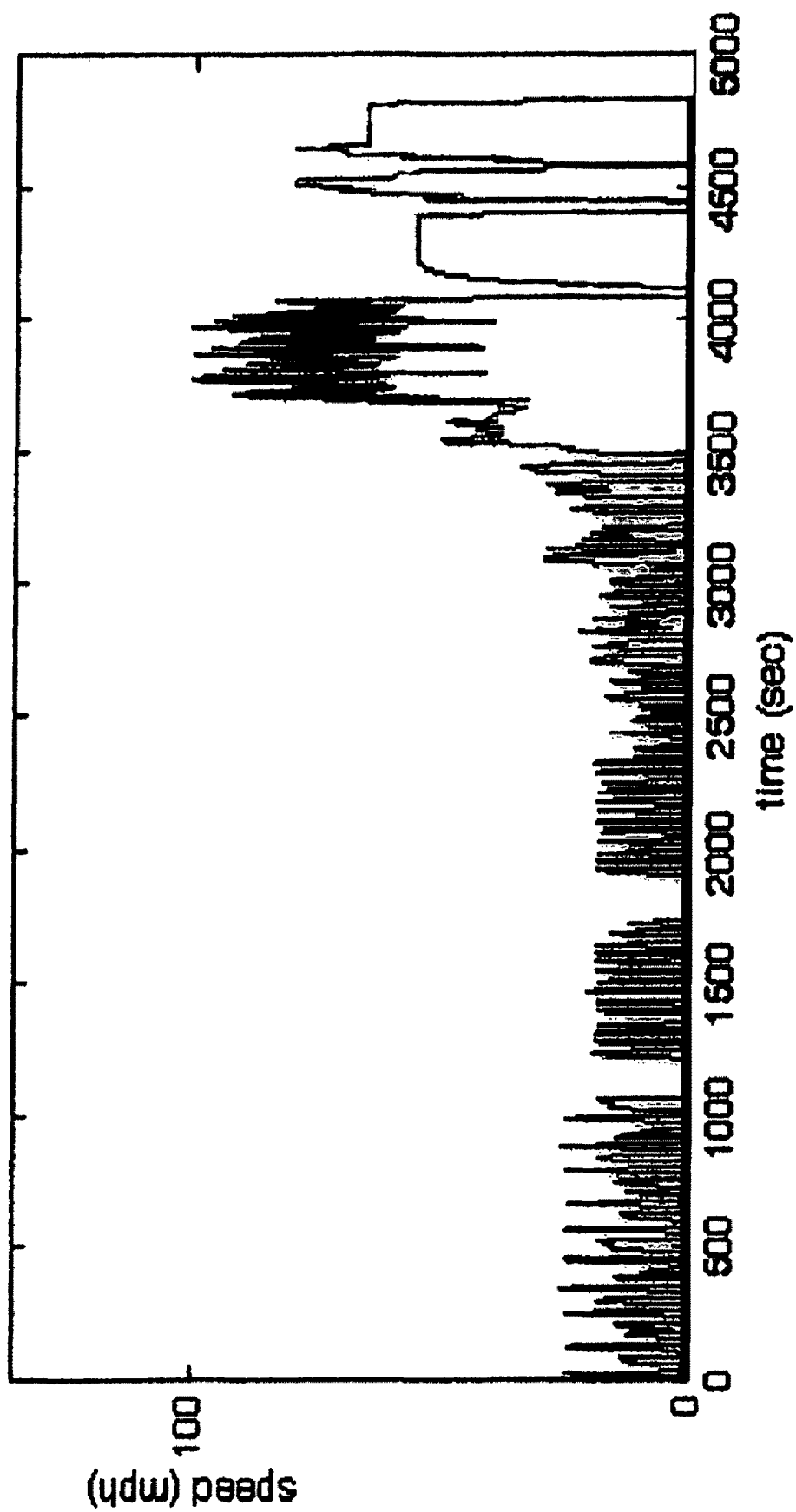
FIG. 21 shows a plot of the driving pattern, according to an embodiment of this invention.

With the trained ANN evaluations were made if the ANN 20 will give superior performance on a driving schedule which combines the four driving patterns on which it was trained, as shown in FIG. 21, for example. As shown in FIG. 20 as Table V, the ANN CS does include superior performance. The fuel economy is increased by 6.25% over the next best performing model of the fuel mode control. Also, there is 3.66% more energy in the battery if the ANN CS is used rather than the fuel mode control. The ANN 20 provides good results in any discrete driving cycle and the highest in the combined driving cycle which represents a more typical range of driving of the HEV.

According to an embodiment of this invention, other driving schedules or simulations are possible. The training data 26 can include any suitable range to allow the ANN 20 to behave optimally under all driving conditions so a more comprehensive data set is possible.

A reason less optimal performance of the ANN 20 may occur when presented with new data may be the lack of the ability of this particular network to generalize, such as, due to overtraining. As can be seen from FIG. 15 the error levels off at 150 epochs, but the network is trained for 450, for example. Overtraining may be investigated by introducing a testing set for the ANN 20 to present inputs and compare the outputs to desired outputs. The goal is to minimize the error. If the network 20 is being overtrained, the training set 26 error will reduce while the testing set error will rise and may result in instability, for example. A training set 26 may be incorporated in the ANN 20 optimization, for example.

According to an embodiment of this invention, the "optimal" data set was obtained by utilizing the data points generated by a control strategy which gives the maximum fuel economy over a given driving cycle. Other even higher fuel economies may be possible. A more systematic approach for optimizing a CS over a driving pattern is possible, such as, using computational intelligence approaches including a genetic algorithm. Alternately, a much larger number of control approaches can be considered to further optimize the training set. Other vehicle layouts are possible, for example, to provide an ANN CS for an HEV with a planetary gear set. Finally, a generalized algorithm for the development of a CS for any HEV is possible. Those skilled in the art and guided by the teachings herein will appreciate that the ANN CS's may be used in other applications, such as, optimization of an electrical grid with different power sources including solar, coal and/or nuclear based sources.

It will be appreciated that details of the foregoing embodiments, given for purposes of illustration, are not to be construed as limiting the scope of this invention. Although only a few exemplary embodiments of this invention have been described in detail above, those skilled in the art will readily appreciate that many modifications are possible based at least in part on the exemplary embodiments without materially departing from the novel teachings and advantages of this invention. Accordingly, all such modifications are intended to be included within the scope of this invention, which is defined in the following claims and all equivalents thereto. Further, it is recognized that many embodiments may be conceived that do not achieve all of the advantages of some embodiments, particularly of the preferred embodiments, yet the absence of a particular advantage shall not be construed to necessarily mean that such an embodiment is outside the scope of the present invention.

What is claimed is:

1. A hybrid electric vehicle including an electric motor, a battery and an internal combustion engine, the vehicle comprising:
    a power control module having an adaptive control unit for interfacing with sensors and actuators of the electric motor, the battery and the internal combustion engine;
    the adaptive control unit including an artificial neural network that is adapted to changing driving conditions or patterns, the artificial neural network comprising an input layer, a hidden layer and an output layer, wherein the input layer comprises between five and fifty neurons, the hidden layer comprises between five and fifty neurons and the output layer comprises between one and ten neuron; and
    a combined control strategy for an entire operating range of the hybrid electric vehicle including a plurality of control strategies for a plurality of driving profiles with optimized operation points of each of the plurality of driving profiles, wherein the artificial neural network combines the optimized operation points of each of the plurality of driving profiles into the combined control strategy.

2. The vehicle of claim 1 wherein the adaptive control unit includes at least one of the group consisting of a digital signal processor, a micro-processor, a field programmable gate array and combinations thereof.

3. The vehicle of claim 1 wherein the vehicle includes at least one of the group consisting of a car, a bus, a truck, and a sport utility vehicle.

4. The vehicle of claim 1 wherein the adaptive control unit signals to at least one of the actuators to maximize fuel economy, minimize emissions, meet peak power demands and to respond to changing driving conditions.

5. The vehicle of claim 4 wherein the changing driving conditions include urban profiles, highway profiles and combinations thereof.

6. The vehicle of claim 1 wherein the fuel economy improves by at least between about 1 percent and about 7 percent above a constant causal based control scheme.

7. The vehicle of claim 1 further comprising a training set based on changing driving conditions or profiles for training the artificial neural network.

8. The vehicle of claim 7 further comprising a pre-processing algorithm to operate on the training set and reduce repetitive row vectors.

9. The vehicle of claim 7 wherein the training set includes input and output values based on highest fuel economies for various driving conditions and control schemes.

10. The vehicle of claim 1 further comprising a plug for plug-in hybrid functionality.

11. A hybrid electric vehicle including an electric motor, a battery and an internal combustion engine, the vehicle comprising:
    a power control module having an adaptive control unit for interfacing with sensors and actuators of the electric motor, the battery and the internal combustion engine;
    the adaptive control unit including an artificial neural network that is adapted to changing driving conditions or patterns, wherein the artificial neural network includes an input layer having about 20 neurons, a hidden layer having about 20 neurons and an output layer having about 1 neuron; and
    a combined control strategy for an entire operating range of the hybrid electric vehicle including a plurality of control strategies for a plurality of driving profiles with optimized operation points of each of the plurality of driving profiles, wherein the artificial neural network combines the optimized operation points of each of the plurality of driving profiles into the combined control strategy.

12. The vehicle of claim 11 wherein the adaptive control unit includes at least one of the group consisting of a digital signal processor, a micro-processor, a field programmable gate array and combinations thereof.

13. The vehicle of claim 11 wherein the adaptive control unit signals to at least one of the actuators to maximize fuel economy, minimize emissions, meet peak power demands and to respond to changing driving conditions.

14. The vehicle of claim 13 wherein the changing driving conditions include urban profiles, highway profiles and combinations thereof.

15. The vehicle of claim 11 further comprising a training set based on changing driving conditions or profiles for training the artificial neural network.

16. The vehicle of claim 15 further comprising a pre-processing algorithm to operate on the training set and reduce repetitive row vectors.

17. A method of operating a hybrid electric vehicle comprising:
    providing a hybrid electric vehicle having an adaptive control unit, wherein the adaptive control unit includes an artificial neural network;
    receiving input signals from sensors of the hybrid electric vehicle;
    calculating output signals in the adaptive control unit based on maximizing fuel economy, minimizing emissions, meeting peak power demands and providing acceptable transient response during changing driving conditions;
    sending output signals to an internal combustion engine or an electric motor of the hybrid electric vehicle; and
    training the artificial neural network with a plurality of control strategies for various driving conditions or profiles for a sufficient number of iterations and combining optimized operation points of each of the various driving conditions or profiles into a combined control strategy, wherein training includes a Levenberg-Marquardt training algorithm and a gradient decent learning algorithm with momentum weight/bias.

18. The method of claim 17 further comprising applying a pre-processing algorithm to the plurality of control strategies for reducing repetitive vectors.

19. The method of claim 17 further comprising periodically updating the step of calculating based on age or wear of drivertrain components.

20. The method of claim 17 wherein the artificial neural network signals to at least one of the actuators to maximize fuel economy, minimize emissions, meet peak power demands and to respond to changing driving conditions or profiles including urban and highway use.

* * * * *